April 23, 1968    G. T. RANDOL    3,379,291
TRANSMISSION WITH CLUTCH HAVING FLUID AND SPRING RELEASE MEANS
Filed May 11, 1965    5 Sheets-Sheet 3
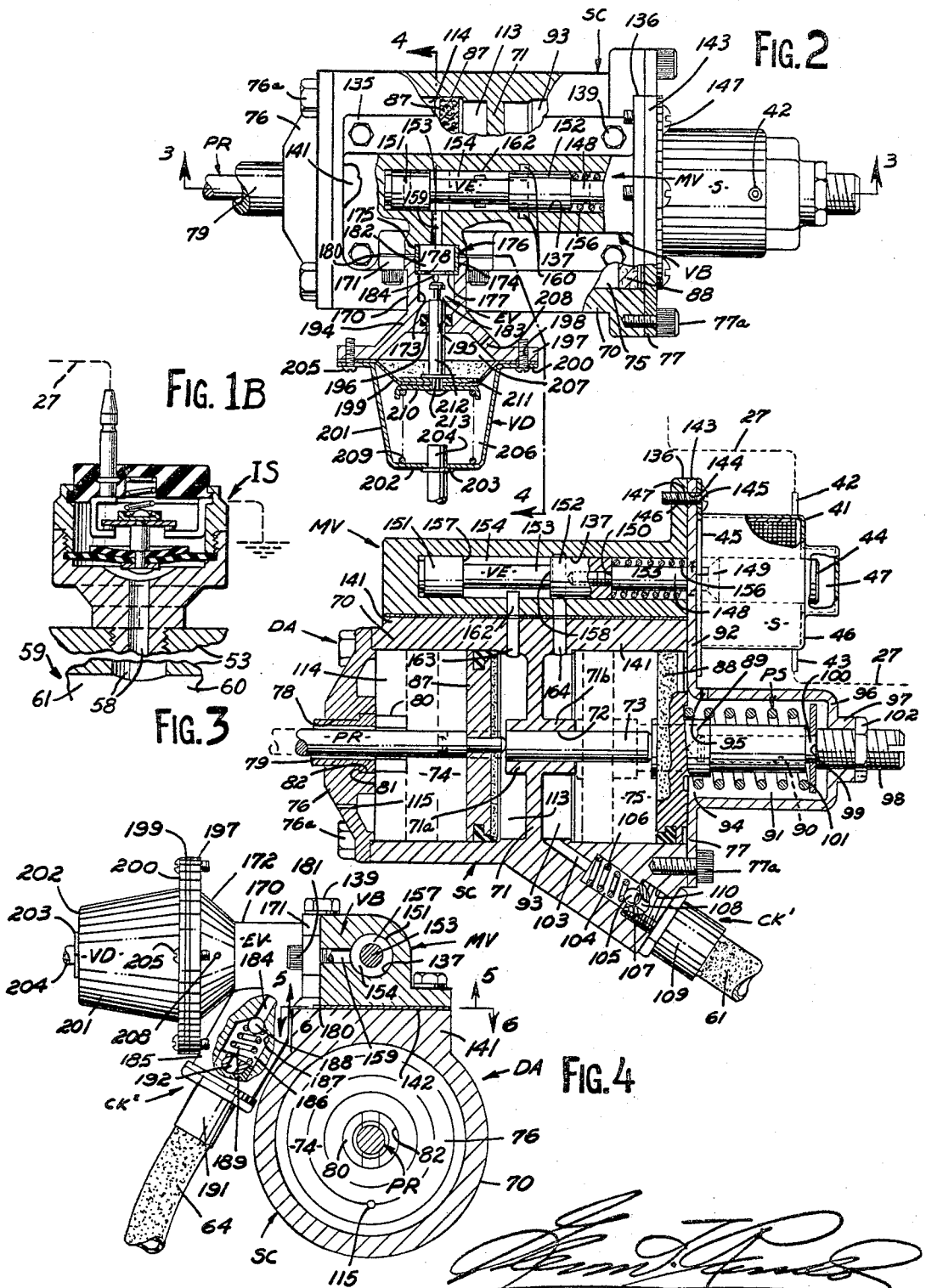
Inventor

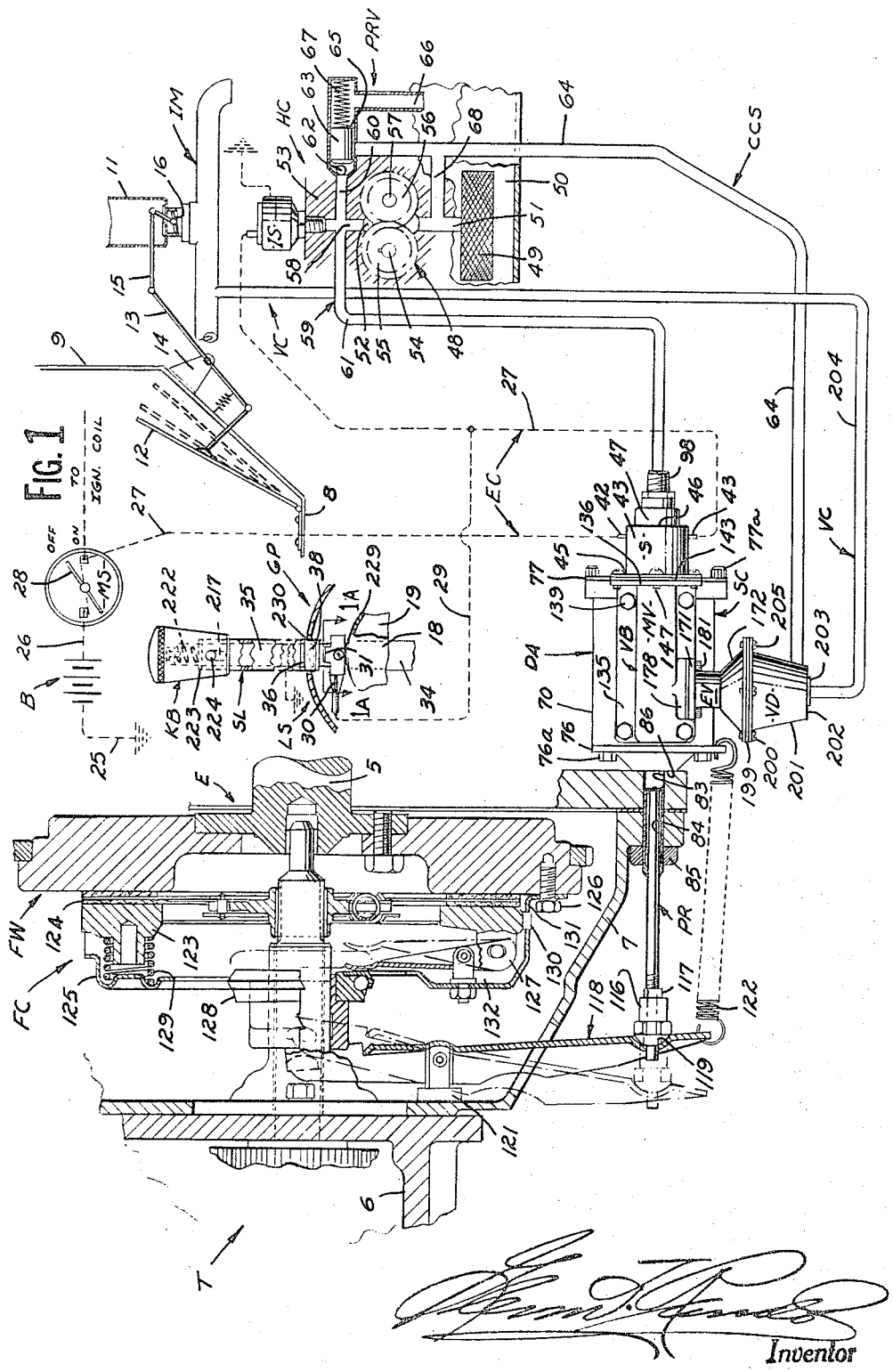

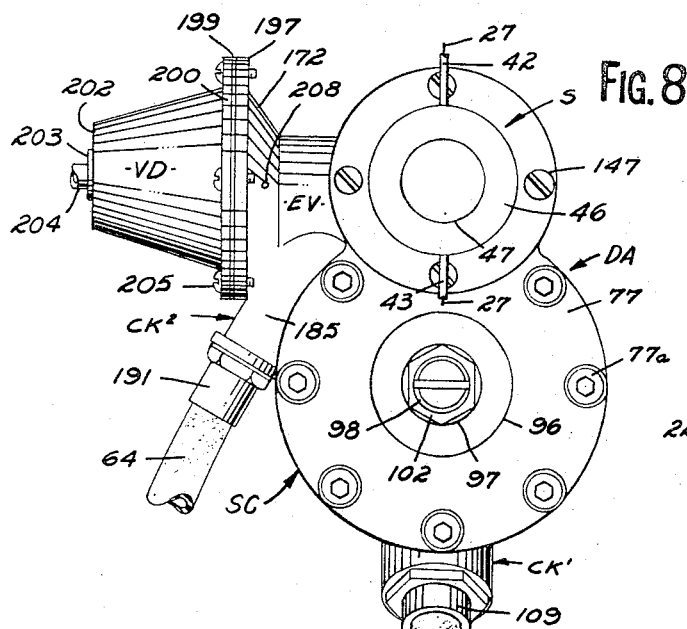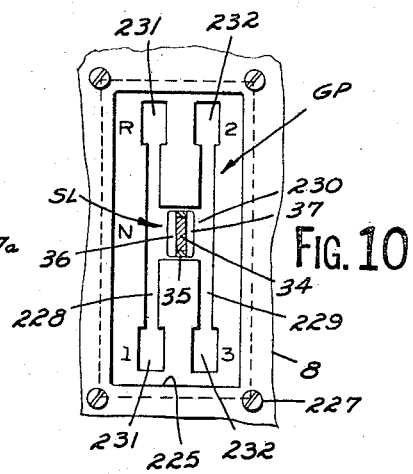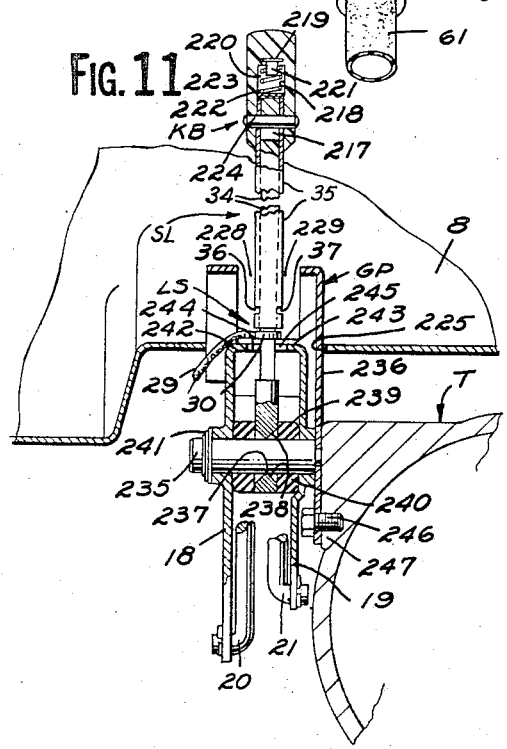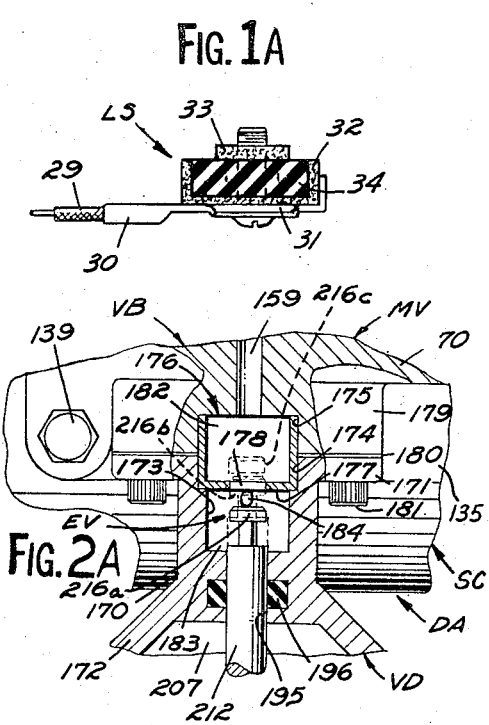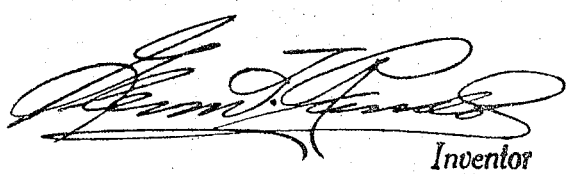

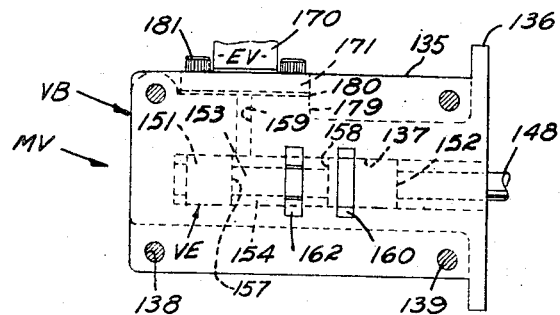
FIG. 5
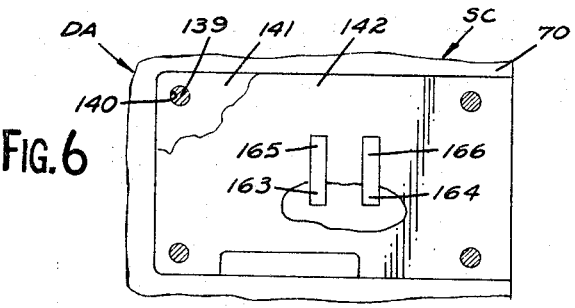
FIG. 6
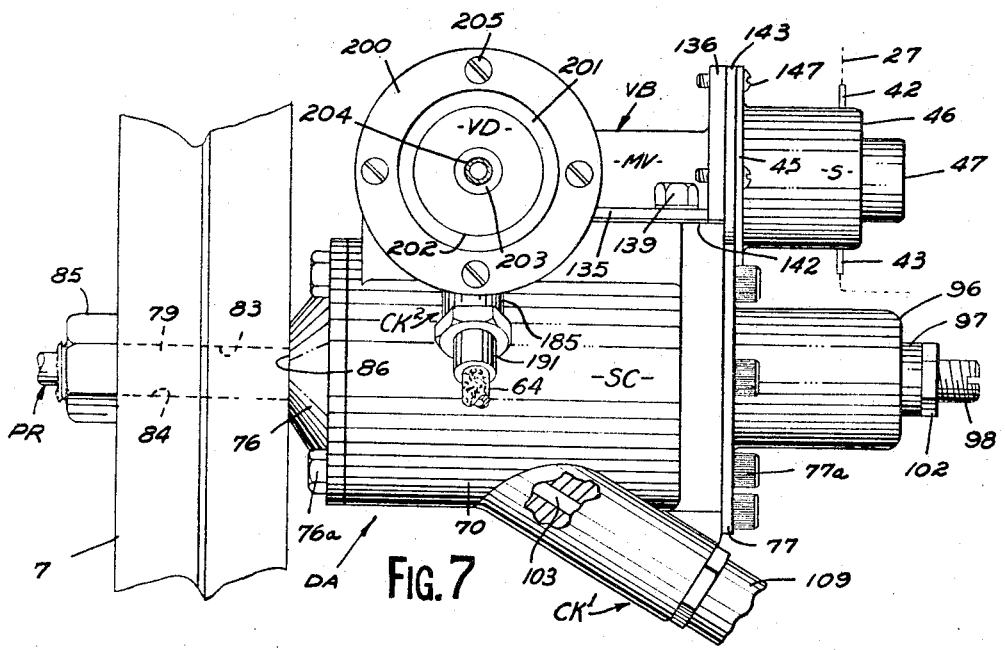
FIG. 7
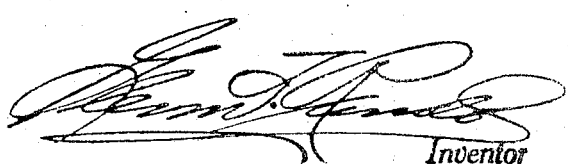
Inventor

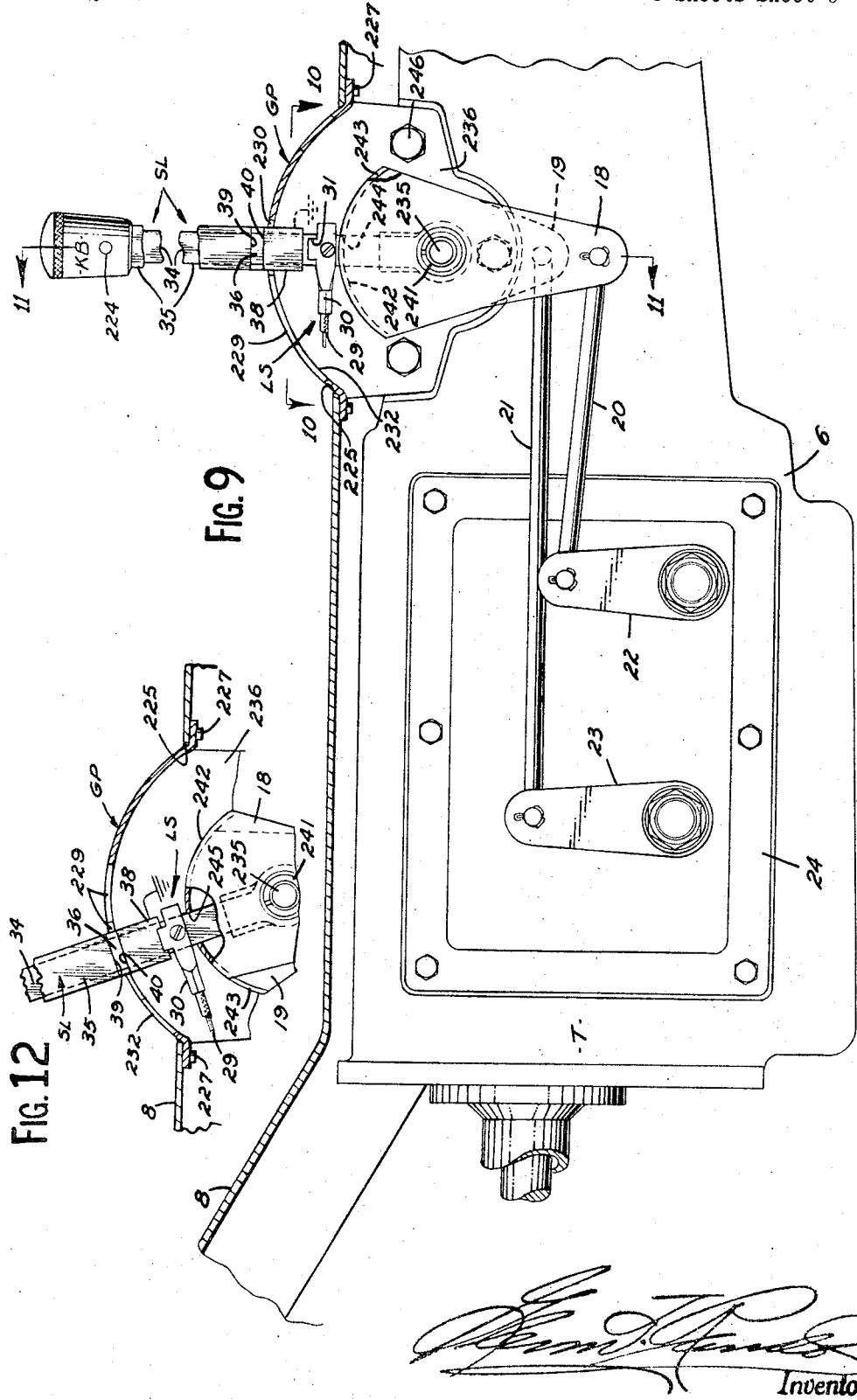

United States Patent Office 3,379,291
Patented Apr. 23, 1968

3,379,291
TRANSMISSION WITH CLUTCH HAVING FLUID
AND SPRING RELEASE MEANS
Glenn T. Randol, Mountain Lake Park Md.
(3 E. 2nd Ave., Loch Lynn Heights, Md. 21550)
Filed May 11, 1965, Ser. No. 454,937
30 Claims. (Cl. 192—.052)

ABSTRACT OF THE DISCLOSURE

This invention is related with the art on automatic clutch controls and systems utilizable by motor vehicles and the like for controlling the master friction clutch interposed in the drive line between the vehicle engine and associated change-speed drive transmission (gearbox), the invention having special reference to a novel and improved electro-hydraulic-vacuum control system having particular utility in operative association with that type of gearbox controllable by a floor mounted shift-lever selectively manipulative by the driver at will to change the transmission speed drive or to effect neutral thereof in coordination with automatic declutching and reclutching operations of said clutch, and wherein auxiliary disengaging means are effective automatically under driver supervision to release the engine for starting when the latter is under torque-load produced by the vehicle while parked "in-gear."

My invention relates generally to automatic clutch control constructions, and more particularly to a novel and improved electro-hydraulic-vacuum control system for the master friction clutch conventionally interposed in the drive line between the vehicle driving engine and associated change-speed transmission (gearbox), said control system having particular utility in association with the commercially known floor-shift lever. The invention constitutes an improvement on the Automatic-Clutch Power Transmission, disclosed in my prior copending application Ser. No. 247,391 filed Dec. 26, 1962 now Patent No. 3,245,502 dated Apr. 12, 1966.

For several years, workers in the art to which the present invention relates, have given much attention to the development of semi-automatic and fully automatic transmissions and, as is well known, these types of transmissions are more complicated therefore more costly, and less economical in operation than the conventional countershaft transmissions which have dominated automotive installations since the advent of the automobile as a practical form of transportation and at present the demand is increasing with certain automobile makers offering this latter type of transmission as standard equipment rather than the former complicated types above mentioned.

In operation, more engine power is absorbed by an automatic transmission, and notwithstanding the automatic transmission makes driving of an automotive vehicle easier which accounts for its popularity over the countershaft-type transmission, it is expensive to produce and increases the cost of operating a motor vehicle.

Among the aforementioned salient advantages characterizing the countershaft transmission, is the feature enabling the driver to park the vehicle "in-gear" without necessarily having to apply the vehicle parking brake when utilizing an operator-operated clutch of commercial construction and operation. However, when the clutch is power-operated, provision must be made for opening the clutch to enable return of the shift-lever from its "in-gear" position to "Neutral" to release the engine for starting when the vehicle has imposed a coasting-torque on the drive line due to resistance provided by engine-compression braking for stabilizing the vehicle in its parked location. Under such "in-gear" parking, without the aforesaid clutch opening provision, the vehicle would be rendered inoperative, and it is this serious drawback to eliminating the clutch-pedal that has influenced in part the popularity of the so-called fluid-coupling and torque-convertors since these latter forms of drive connections from the vehicle engine are impositive and, therefore, leave the engine free for starting at all times even though a speed-drive of the transmission may be concurrently activated.

It is, therefore, a primary objective of my invention to produce a clutch controlling system incorporating the essential advantages of an automatic transmission while utilizing the conventional countershaft transmission in operative association with a power-controlled clutch without sacrificing the ability to park the vehicle "in-gear" as though an operator-operated clutch were involved in the drive system. The clutch control system is so arranged that clutch disengagement is responsive to release of the engine accelerator pedal and/or manual-shifting of the transmission from one speed to another or neutral. Also engaging means of novel construction and operation are provided and which are responsive to accelerator pedal depression from released position whereby the clutch will automatically and smoothly engage under driver supervision, and upon vehicular movement becoming effective, the transmission can be manually-shifted into higher speed drives without requiring operator (driver) disengagement of the clutch to facilitate such speed changes. Therefore, an object is to provide an engaging control simulating follow-up control under drive supervision for regulating the clutch into firm engagement.

Another object of the invention is to provide a simplified floor-shift mounted controlling system for semi-automatically controlling clutch engagement in association with the conventional countershaft transmission, and which includes an auxiliary clutch disengaging means wherein automatic disengagement of the clutch is effective in response to limited relative movement of a portion of the shift-lever assembly to remove torque-load from the engine for ease of starting when coasting-load is impressed on the engine as a result of parking "in-gear" with the vehicle free to move.

Still another object of the invention is to provide a shift-lever controlled switch effective when closed to control in part power-disengagement of the clutch to facilitate gear-changing after the vehicle is underway, and wherein closed condition of said switch is maintained automatically during a speed-changing operation to prevent inadvertent opening of the switch with attendant premature re-engagement of the clutch resulting in possible damage to the positive meshing elements comprising the different speed drives of the transmission.

A further and important object of the invention is to provide simplified and improved controls for a power-actuated clutch which insure smooth engagement of the clutch under all conditions.

A more specific object of the invention is to provide a hydraulically-operated clutch wherein a unitary hydraulic power unit is operative to effect disengagement and control re-engagement of the clutch in part under normal operating conditions of the vehicle, and wherein a spring-loaded power chamber is automatically effective in response to a manual control device embodied in the shift-lever, to disengage the clutch and thereby releasing the engine for starting in the event of coasting-load being imposed thereon as a result of parking the vehicle "in-gear" under free roll, said power chamber being continuously energized from the fluid pressure flow utilized to normally operate the clutch to disengage, when the vehicle is at rest and the engine is being utilized as a compression power-brake.

An object of the invention related to the object next above, is to provide control valve means effective for controlling operation of the power unit to normally engage and disengage the clutch with engagement thereof being controlled in part thereby, and to also control said power chamber to effect disengagement of the clutch automatically at will when the vehicle and engine are at rest with parking "in-gear" effective in response to operating said manual control device prior to shift-lever movement to establish a speed-drive in the transmission.

Another object of the invention is to provide a novel and improved hydraulic clutch-servo cylinder comprising a pair of power-pistons coaxially arranged in tandem and which are capable of being interconnected by either hydraulic fluid and/or mechanical means whereby movement of one of the power-pistons under perenergized means is effective to simultaneously move the other power-piston in one direction to disengage the engine clutch, said one power-piston being maintained operatively energized to displace fluid and/or impart mechanical thrust against the other power-piston for simultaneous actuation of said power-pistons to effect such clutch disengagement, while the other power-piston is utilizable for controlling normal disengagement and reengagement of the clutch independently of said one power-piston in pre-energized condition comprising the aforesaid novel auxiliary disengaging means, said operativeness of the one power-piston to disengage said clutch being effected solely under operator supervision when return of the shift-lever to "Neutral" is impeded by coasting-load imposed on the drive line caused by roll of the vehicle while parked "in-gear."

Still another salient object of the invention is to provide clutch-engaging control means responsive to engine torque defined in terms of vacuum efficiency produced in the intake-manifold of the engine when operating, and wherein mechanical linkage between said means and the accelerator pedal is eliminated too simplify installation on the vehicle and prevent asynchronous conditions between said pedal and means resulting from wear in the pivotal connections in said linkage.

Other objects, advantages and features of my invention will be apparent from the following detailed description of a preferred illustrative embodiment, taken in conjunction with the accompanying drawings, in which:

FIGURE 1 is a sectional view in part of a power-operated clutch embodying the principles of my novel clutch control system shown schematically in part with the clutch fully engaged, the associated transmission in "Neutral," and the engine at rest;

FIGURE 1A is a transevrse section taken along the 1A—1A of FIGURE 1 showing details of the shift-lever mounted switch;

FIGURE 1B is a vertical section of the pressure-responsive interrupter switch device in FIGURE 1, showing structural details thereof;

FIGURE 2 is an enlarged plan view partly in section of the unitary dual power unit shown in FIGURE 1 for controlling the clutch, and particularly revealing details of the main control valve means therefor;

FIGURE 2A is a fragmentary view of FIGURE 2 on an enlarged scale of the clutch engaging-control valve means with clutch arresting and engaging control positions shown by dashed lines;

FIGURE 3 is a vertical-longitudinal section taken along the line 3—3 of FIGURE 2 showing details of the two power units and solenoid-spring operated control valve therefor in normal position isolating the said power units, and wherein operative energization of the solenoid is effective to establish the dashed line position to interconnect said power units;

FIGURE 4 is a transverse view partly in section taken along the line 4—4 of FIGURE 2 showing particulars of the return line check-valve and the manner of mounting the main control valve for said power units atop the dual power unit;

FIGURE 5 is a longitudinal section taken along the line 5—5 of FIGURE 4 showing particulars of the two fluid channels (passages) incorporated in the main valve body;

FIGURE 6 is another longitudinal section taken along the line 6—6 of FIGURE 4 showing the pair of spaced valve passages (ports) embodied in the wall of said dual power unit and which cooperate with the two fluid channels in the main valve body;

FIGURE 7 is a side elevational view of the dual power unit shown in FIGURE 1;

FIGURE 8 is an end elevational view of the dual power unit showing in particular the pressure input and return lines;

FIGURE 9 illustrates a commercial countershaft transmission in operative association with my novel floor-shift lever control therefor and for said power-actuated clutch;

FIGURE 10 is a view taken from the line 10—10 of FIGURE 9 showing the shift-lever control and locking gate plate with the lever shown in cross section in "Neutral" position;

FIGURE 11 is a vertical sectional view taken along the line 11—11 of FIGURE 9 and showing details of the floor-shift lever, its linkage connections to the transmission, and the novel control device (switch) embodied in said lever for controlling in part hydraulic-disengagement of the clutch prior to movement of the shift-lever to activate a selected gear drive; and FIGURE 12 is a fragmentary view of FIGURE 9 showing the shift-lever in motion to establish intermediate (second) speed drive in the transmission, the shift-lever switch closed for disengagement of the clutch, and the manual knob atop the shift-lever depressed and so maintained during the shifting operation by interaction of portions on said shift-lever and control gate plate, respectively.

Reference is now made to FIGURE 1 wherein I have disclosed my novel clutch control system generally designated CCS and comprising an electric circuit EC, a hydraulic circuit HC, a vacuum circuit VC and including operating components which are arranged to control fluid pressure disengagement delivery and reengagement release to and from, respectively, a friction engaging device herein disclosed as a spring-engageable clutch mechanism designated FC, one of said components being a dual hydraulic servo-mechanism (clutch actuator) DA for controlling in part said clutch mechanism. The clutch mechanism FC is arranged for transmitting torque between an internal-combustion engine E fragmentarily illustrated by portions of its crankshaft 5 and connected flywheel FW, and a transmission T (see FIGURE 9) fragmentarily shown by portions of its housing 6 and gearing in FIGURE 1, said transmission being mounted on the rear end of a conventional engine-adapter housing 7, and herein disclosed in the form of the conventional synchromesh countershaft type for providing three forward speed drives and a reverse speed drive for driving the drive wheel of an automotive vehicle or the like fragmentarily designated by its driver compartment floorboard 8 and firewell 9. The engine includes a conventional carburetor 11 mounted on the intake-manifold IM for supplying fuel to the engine in accordance with depression of the accelerator pedal 12 through the intermediary of a linkage comprising a lever 13 pivotally mounted on a bracket at 14 on the engine side of the firewall 9 and a link 15 which interconnects the lever 13 with the carburetor throttle-valve 16. The transmission is manually-shifted between its different gear ratios by means of a shift-lever SL selectively connectible to shifting arms 18, 19 connected by links 20, 21 to gear-actuating arms 22, 23, respectively, pivotally mounted on the cover plate 24 of the transmission T (see FIGURE 9).

The aforesaid electric circuit EC shown in FIGURE 1, includes a storage battery B with a ground 25, a feeder lead 26 connecting the battery to one side of a master (ignition) switch MS, and the other side of the switch being connected to an ignition coil lead and a conductor 27, said switch having a manual bridging element 28 movable from its dashed line position and to its solid line position to turn the switch "off," whereby the electric circuit is de-energized and the engine at rest; a branch conductor 29 leads from said conductor 27 to one side of a shift-lever controlled switch LS mounted on the lower side of the shift-lever SL by means of a screw-attached terminal 30 having an upstanding flexible contact 31 which normally lies in spaced relation to the side of the said lever. This terminal contact is insulated from the lever by hard rubber segments 32, 33 with segment 33 having a threaded hole for engagement by said screw to produce a unitary assembly of the switch and lever best demonstrated by FIGURE 1A. The shift-lever SL is preferably in rectangular cross section as shown in FIGURE 1A, and comprises a pair of elongated telescopically-related inner and outer members 34, 35, respectively. The lower end portion of the outer (tubular) member 35 is processed with a pair of opposed side channels 36, 37 best shown in FIGURE 10, and which are spaced from the lower extremity 38 of said tubular member, with each channel defining an upper horizontal shoulder 39, and a lower arcuate shoulder 40. These shoulders perform an important "safety" function as will appear. The lower end 38 of the tubular member 35 produces the ground for the switch LS and is normally spaced from the flexible contact 32 as shown in FIGURES 1 and 9 to interrupt the branch conductor 29. It is thus seen that the grounded tubular member and flexible contact 32 produce the shift-lever switch LS.

A valve-actuating device (solenoid) S is interposed in series in said conductor 27 and comprises a cup-shaped casing containing a winding 41 connected at opposite ends to a pair of external insulated terminals 42, 43, said solenoid when energized being effective to move its armature 44 in one direction for valve actuation as will appear. An annular outstanding flange 45 defines the open end of said solenoid casing and the closed end 46 is formed with a centrally extruded cup-like portion defining a clearance chamber 47 for the outer end portion of said armature (see FIGURE 3). Also connected in series with said solenoid winding is a commercial-type pressure-responsive interrupter switch IS provided with a ground terminal as shown in FIGURE 1, and which is structurally depicted in FIGURE 1B.

The aforesaid hydraulic circuit HC includes a pump 48 of any suitable construction and which is arranged for drawing fluid such as the engine lubricating oil through an oil screen (filter) 49 from an oil reservoir (sump) 50 by means of an inlet passage 51, and for delivering pressurized oil to an output chamber 52 located in a casing 53 which also contains the pump. This pump is driven by the engine camshaft (not shown), for example, in any suitable manner, and preferably shown drivingly connected to a pump drive shaft 54 keyed for co-rotation with a pump drive gear 55 which operates in constant meshing relation with a pump driven gear 56 rotatably mounted on a shaft 57 fixed on said pump casing as shown. The pressure chamber 52 communicates with a passage 58 connected to said interrupter switch IS operable to open position by fluid pressure and to closed position under spring force, and a duct 59 intersecting the latter passage produces two branches 60, 61 with branch 60 communicating with an oil gallery port 62 and a pressure regulator valve PRV having a spring-loaded valve piston 63 exposed at one end to said connected branch duct 60, and normally closing another duct 64 leading to a connected clutch engaging-control valve generally designated EV, and the opposite spring-biased end 65 of said valve piston continuously communicates with a drain passage 66 leading to the aforesaid oil sump. The other branch duct 61 leads to the aforesaid servo-mechanism DA. The oil gallery port 62 continuously communicates with the working parts of the engine and the rear (left) end of the valve piston 63 as shown in FIGURE 1, thus enabling an adequate lubrication pressure during engine idling before any oil pressure is diverted for activating hydraulic clutch disengagement. The aforesaid pressure regulator valve also functions to establish the maximum pressure producible by the pump 48 for lubricating and clutch-activating purposes. The valve piston 63 is urged toward closed position as shown in FIGURE 1 by means of a normally compressed spring 67 which yields under influence of fluid pressure acting on said valve piston to open and thus connects ducts 60, 64 when a predetermined maximum pressure flow has been achieved by the pump and delivered to pressure chamber 52. A third branch duct 68 interconnects the duct 64 with the inlet passage 51 for return flow of oil from the pressure regulator valve back into the oil sump.

The aforesaid hydraulic clutch actuator DA herein disclosed in the form of a dual-piston servo-cylinder SC comprises a cylindrically walled fluid chamber enclosure (casing) 70 open at opposite ends and having an intermediate partition wall 71 with a pair of coaxial hub-like projections 71a and 71b processed with a coextensive axial bore 72 through which a force (thrust) transmitting element (push-rod) 73 projects in oiltight sealed relationship thereto for transmitting thrust from one piston to the other and enabling either of said pistons to move independently of the other in one direction only for an important purpose to appear. The wall 71 serves to divide the interior of the servo-cylinder into a pair of opposed hydraulic chambers 74, 75, said chambers being open at their outer ends which are closed by means of a pair of plate-like heads 76, 77, respectively, with head 76 attached by cap screws 76a as shown to close chamber 74, and the other head 77 being adapted to close the open end of chamber 75 as by means of cap screws 77a. The head 76 is formed with a central circular aperture 78 and projecting from the inner side of this head through said aperture to the exterior thereof, is a tubular mounting member 79 provided with an outstanding flanged portion 80 defining an annular shoulder 81 which fits into a counterbore 82 coaxial with said aperture as shown best in FIGURE 3. This tubular member is adapted to mount the servo-cylinder SC on the side of the vehicle engine by extending through coaxial holes formed in the flanges 83, 84 for mounting the engine-adapter housing 7, and a hexnut 85 engaging the rear end threaded portion of said tubular member impinges the rear face 86 of the head 76 against the confronting face on the adjacent flange 84 to thereby mount the servo-cylinder in operating position as shown in FIGURE 1.

Reciprocable in said chambers 74, 75 are power-pistons 87, 88, respectively, each having a lip-type pressure sealed packing defining the periphery thereof. Projecting forwardly from the central portion of power-piston 88 is a cylindrical extension 89 provided with a blind axial bore 90, and which normally projects into a power-spring chamber 91 formed by forwardly extruding the central portion of that portion of said head overlying chamber 75. The power-piston 88 when energized, is normally in contact with the vertical portion 92 of the head 77 to serve as stop means for the latter power-piston when fully retracted under influence of pressurized fluid delivered by the pump 48 into the aforesaid output chamber 52, thence through conduit 61 into a fluid-control (working) chamber 93 between the wall 71 and left side of the power-piston 75, the right side of the latter defining one end of an atmospheric chamber 94 which is continuously vented to atmosphere by passage 95. The forward closed end 96 of the power-spring chamber 91 terminates in a flanged threaded opening 97, and threadingly engaging said opening is a complementally threaded spring-pressure adjusting screw 98 which is formed at its inner end with an annular shoulder 99 defining a reduced diameter elongated smooth stem 100 projecting into the aforesaid axial bore 90 to slidably support said power-piston 88 thereon.

Mounted on the stem is a washer-like spring seat 101 in abutment with the aforesaid shoulder 99 as shown in FIGURE 3. A normally compressed power-spring PS encircles the extension 89 to react between the spring seat 101 and confronting face portion on the front side of the power-piston 88 whereby fluid pressure introduced into the control chamber 93 is effective to retract the power-piston 88 to the position shown in FIGURE 3 to effect maximum energization of the power-spring PS to produce the aforesaid auxiliary disengaging means whereby clutch disengagement is effected at the will of the vehicle driver upon releasing the fluid pressure in the control chamber 93 to act against the power-piston 87 which will be fully explained later. A hex-nut 102 on the exterior of the adjusting screw 98 engages the front end of the flanged opening 97 to stabilize the screw in its axially adjusted position, it being noted that the spring seat 101 moves axially as a unit with said screw whereby the latter is capable of establishing the power-spring PS at different compressed levels according to the installation involved.

An angular fluid inlet passage 103 formed in a correspondingly angulated boss extending from the underside of the servo-cylinder SC, communicates with the control chamber 93 with the outer end of said latter passage opening into a counterbore 104 in which a spring loaded movable element (ball) 105 and a normally compressed spring 106 therefor are housed to produce a check-valve $CK^1$, said ball being adapted to engage a seat 107 defining the inner confronting end of another axial passage 108 formed in a rigid fitting 109 having one end threaded into a second counterbore 110 and the opposite end connected to the aforesaid branch duct 61 which is flexible (see FIGURE 3).

Power-spring movement of the power-piston 88 is limited by engaging the end of confronting hub-like projection 71b on the wall 71, and retracted to energize said power-spring PS by oil pressure flow from the pump 48 delivered through said check-valve past its yielding ball 105 into the control chamber 93.

The power-piston 87 is reciprocably mounted in chamber 74 and serves to divide said chamber into a fluid-control (working) chamber 113 and an atmospheric chamber 114, the latter chamber being continuously vented to atmosphere via passage 115 through the closure head 76 (see FIGURE 3). A work-performing element (piston-rod) PR is fixed at its inner end to the central portion of the power-piston 87, and operably projects rearward through the aforesaid tubular mounting member 79. The outer end portion of said piston-rod is fitted with an axially adjustable working-head 116 which is threaded onto said piston-rod and locked in its adjusted position by a hex-nut 117 (see FIGURE 1).

Normal fully retracted position of the power-piston 87 as shown in FIGURE 3 is established by the right reduced end of the piston-rod PR abutting the confronting end of the plunger 73 when the power-piston 88 is also fully retracted. However, normal position of the power-piston 87 may also be established by extending the hub-like projection 71a sufficiently for engagement by the confronting face portion on the right side of the latter power-piston, either or both of these methods may be employed as stop means for the power-piston 87 defining its fully retracted position corresponding to full engagement of the clutch FC shown in FIGURE 1.

The outer end portion of a clutch-operating (throw-out) lever 118 is formed with a complemental depression 119 for pivotal connection with the aforesaid working-head 116. This throw-out lever is pivotally mounted intermediately on a strut 121 fixed to the closed end of the aforesaid engine-adapter housing 7 as shown in FIGURE 1. A return spring of the expansion type is shown at 122 and connected at opposite ends to the lever 118 and a portion of the casing of the servo-cylinder SC for providing means adapted to return the lever and power-piston 87 to their respective normal released positions in cooperation with spring force acting on the aforesaid spring-engageable clutch FC, when actuating fluid pressure is relieved in the control chamber 113.

The inner end of the lever 118 is connected to a movable clutch pressure plate 123 which is arranged to apply clamping force on a clutch driven disc 124 disposed parallelly between the pressure plate 123 and the engine-flywheel FW. A centrally apertured backing plate 125 of generally cup-shaped configuration is flange mounted at its open end on the rear face of the flywheel as by means of cap screws 126 or otherwise, to rotate as a unit therewith. This backing plate serves for pivotal mounting of a plurality of radially arranged clutch-operating (disengaging) levers 127 which have their outer ends connected to the pressure plate as shown and their inner ends acting on a clutch-throw-out bearing 128 with the opposite end of the latter engageable by the bifurcated end of the clutch throw-out lever 118. A plurality of clutch-engaging springs 129 is operatively positioned between the inner face of the backing plate and the confronting face of the pressure plate which is co-rotatable with the backing plate by means of a plurality of circumferentially spaced peripheral lugs 130 projecting through longitudinal slots 131 formed in the cylindrical portion of said backing plate as shown, said engaging-springs being effective to engage the clutch FC, and actuation of the clutch-servo piston 87 to its dashed line position of FIGURE 3 being effective to overcome the engaging-springs 129 and return spring 122 for hydraulic disengagement of the clutch FC as is understood. A plurality of struts 132 is attached to the inner face of the peripheral portion of the apertured end of said backing plate, and which projects horizontally toward the pressure plate for pivotally supporting the intermediate portions of the clutch-operating levers 127 as shown in FIGURE 1.

A main control valve mechanism MV is best demonstrated in FIGURES 2, 3, 4, 5 and 6, and with particular reference to FIGURES 2 and 3, this valve mechanism is shown as comprising an elongated valve body VB formed with side mounting flanges 135 substantially coextensive therewith and defining a rectangular planar surface on the underside of said valve body, a forward upstanding end flange 136, a blind longitudinal bore 137 substantially coextensive with said valve body, and a plurality of marginal holes 138 through which cap screws 139 projects into engagement with threaded holes 140 formed in a complemental embossment 141 integral with the top side of said servo-cylinder casing, and provided with a planar surface to mate with the planar surface on the underside of the valve body as shown in FIGURE 3. Reference is now made to FIGURES 5 and 6 wherein I have shown that said embossment is provided with the aforesaid planar surface, and the valve body with a complemental surface with a sealing gasket 142 therebetween when the valve body is assembled in stacked formation on the servo-cylinder as shown in FIGURE 3.

The upper portion of the closure head 75 terminates in a reduced substantially semicircular portion 143 best shown in FIGURES 2, 3 and 8, and which conforms to the configuration of the end flange 136 on the valve body VB, and is provided with a plurality of circumferentially spaced plain holes 144 in the peripheral marginal portion thereof (see FIGURE 3). The flanged end 45 of the solenoid casing 43 is provided with a corresponding number of plain holes 145 in registry with a like-number of threaded holes 146 formed in the peripheral marginal portion of the end flange 136 whereby cap screws 147 projecting through said registering plain holes into engagement with the threaded holes serve to mount the electric solenoid S in coaxial operating position with respect to the valve bore 137 as shown in FIGURE 3.

The solenoid armature 44 is provided with an elongated reduced diameter stem 148 which projects loosely rearward through a hole 149 in the head portion 143, coaxially positioned with respect to the valve bore 137. This stem terminates in a reduced threaded portion providing an annular shoulder 150 with the normal body of said stem. Slidably interfitting the said valve bore 137 is a spool-type valve element (valve-piston) VE formed with a pair of longitudinally spaced valve lands 151, 152 interconnected by means of a reduced diameter portion 153 to produce with said valve bore between said valve lands, an annular valve chamber 154 as shown in FIGURES 2 and 3. Valve land 152 is processed with a blind axial bore 155 which is threaded for engagement by the threaded end of the armature stem 148 whereby the valve element VE and armature 44 are joined to move as a unit. A normally compressed valve return spring 156 is positioned in the right end portion of said valve bore 137 in encircling relation to said armature stem which normally spans the space between the right end of valve land 152 and confronting marginal portion of the hole 149, said spring 156 being effective to return the valve element VE and connected armature 44 to normal position as shown by FIGURES 2 and 3 wherein the inner confronting annular faces 157, 158 on the valve lands 151, 152, respectively, are positioned to the left of a horizontal fluid outlet passage 159 and overlying a fluid channel 160, respectively, formed in the valve body VB (see FIGURE 2), thus the passage 159 is open to communicate with the aforesaid annular valve chamber 154 and the channel 160 is blocked from communicating with said valve chamber.

Installation of the valve return spring 156 is accomplished by inserting it through the open end of the valve bore after the valve element VE has been installed therein and before attaching the closure head 75, and then connecting the armature stem 148 as above described after the closure head has been placed in position followed by assembly of the solenoid S as shown in FIGURES 2, 3 and 8.

A rectangular passage 162 is cross section is formed through the underside of the valve body as shown in FIGURE 5 to have continuous communication with the aforesaid annular valve chamber 154 and, as shown in FIGURES 3 and 6, said passage 162 and fluid channel 160 also communicate with passages 163, 164 through the servo-cylinder embossment 141 and therefore control chambers 113, 93, respectively, via substantially rectangular openings 165, 166 through the aforesaid interposed sealing gasket.

Accordingly, the fluid control chamber 113 continuously communicates with the aforesaid annular valve chamber 154 in the valve body VB, and the fluid control chamber 93 is continuously connected to the aforesaid fluid channel 160. Movement of the valve element VE to its dashed line position of FIGURES 2 and 3, positions the valve land 151 to block the horizontal passage 159, and at the same time the valve land 152 is moved out of blocking position with respect to the fluid channel 160 whereby actuating fluid delivered through the check-valve CK¹ to the control chamber maintains the power-piston 88 in fully retracted position and its associated power-spring PS at maximum energization, and from control chamber 93 fluid passes through valve channel 160 via passage 164 and interposed gasket opening 166, annular valve chamber 154, passage 162, gasket opening 165 and passage 163 into the control chamber 113 to actuate the clutch disengaging power-piston 87 to its dashed line position of FIGURE 3 and thereby rotating the clutch throw-out lever 118 clockwise as viewed in FIGURE 1 to overcome the clutch-engaging springs 129 and disengage the clutch FC as is understood.

Movement of the valve element VE to its dashed line position of FIGURE 2 is effected by the electric solenoid S when its winding is energized causing its armature 44 to move to the right as viewed in FIGURE 3 wherein the right end of the solenoid armature abuts the inner face of the chamber 47 thus serving as stop means for the retracted dashed line position of the armature. Movement of the valve element VE in the opposite direction under influence of its return spring 156 to its solid line position of FIGURES 2 and 3, is limited by the left reduced end of the valve land 151 engaging the confronting face portion on the blind end of the valve bore 137.

The aforesaid vacuum circuit VC includes my novel clutch engaging-control valve EV comprising a valve body having a generally cylindrical portion 170 terminating at one end as a forward mounting flange 171 and the opposite outer end formed as a cylindrical bell-shaped casing 172 (see FIGURES 2, 2A and 4). The body portion 170 is formed with a blind axial bore 173 and a counterbore 174. A complemental confronting counterbore 175 terminates the outer end of the fluid outlet passage 159 aforesaid in the main valve body VB.

Positioned within said confronting counterbores 174, 175 is a cylindrical cup-shaped member 176 having an end wall 177 centrally apertured at 178, the length of said member being substantially equal to the combined lengths of said counterbores when the mounting flange 171 is attached to a complemental pad 179 integral with a side portion of the valve body VB through which said fluid outlet passage 159 passes to communicate with the counterbore 175 as shown in FIGURES 2 and 2A. An interposed gasket 180 provides an oiltight connection between the flange 171 and pad 179 and a pair of cap screws 181 is utilized as shown to attach the flange to the pad to produce a unitary assembly of the main and engaging-control valves MV, EV, respectively, best shown in FIGURE 2. The aforesaid end wall 177 is longitudinally spaced from the blind end of the axial bore 173 to provide with the interior of the aforesaid cup-shaped member 176, a pair of fluid chambers 182, 193, the latter chamber having communication with an angular fluid passage 184 (see FIGURE 4) axially processed in a correspondingly angulated boss 185 integral with and projecting from the underside of said valve body portion 170. Passage 184 is connected to one end of a check-valve CK² comprising a counterbore 186 and a valve seat 187 at the juncture thereof which cooperates with a movable element (ball) 188 to yieldingly close said passage by means of a normally-compressed spring 189 reacting between said ball and the confronting (upper) end of a rigid fitting 190 threadedly projecting into the open end of said counterbore 186 to close the same oiltight and to provide a check-valve chamber 191, said fitting being processed with an axial fluid passage 192 which communicates with the check-valve chamber 191 and one end of the aforesaid flexible conduit (duct) 64 connected to said fitting as shown in FIGURE 1. Thus, said check-valve CK² functions to prevent cavitation in the valve chamber 154, chambers 182, 193 and interconnecting passage 159 and thereby maintaining a minimum non-activating pressure on the fluid therein as shown in FIGURE 2. The outer end of the chamber 193 is defined by a separating wall 194 having an axial bore 195 fitted with an annular packing 196. The peripheral marginal portion of the aforesaid bell-shaped casing 172 defines an annular flange 197 (see FIGURES 2 and 4) having a plurality of circumferentially spaced threaded holes 198. The peripheral marginal portion of a flexible power-diaphragm 199 is clamped airtight between the aforesaid flange and a complemental flange 200 defining the open end of a cup-shaped casing (cylinder) 201 to produce a vacuum-modulated diaphragm unit (motor) generally designated VD. The motor cylinder 201 is closed at its outer end by an integral wall 202 which is centrally apertured for installation of a rigid vacuum fitting 203 as shown and to which is connected one end of a vacuum conduit 204 and the other end connected to the engine intake-manifold IM.

The peripheral marginal portion of the power-diaphragm 199 is clamped between the flanges 197, 200 in airtight sealed condition by means of a like-number of cap screws 205 projecting through plain holes passing through the marginal portions of the flange 200 and diaphragm into threaded engagement with the threaded holes 198 in the flange 197 to produce a unitary assembly defining the aforesaid vacuum-modulated motor VD. The diaphragm 199 serves to divide the interior of the bell-shaped casing 172 and closure casing 201 into a pair of isolated fluid pressure chambers 206, 207 with the latter chamber being continuously vented to the atmosphere via passage 208 and the other (vacuum) chamber 206 communicating with the fitting connected end of the conduit 204 whereby the diaphragm is continuously sensitive to vacuum conditions within the engine intake-manifold IM therefore torque production of the engine when operating. A normally compressed power-spring 209 is operatively positioned within the vacuum chamber 206 to react between a cup-shaped diaphragm plate 210 and the inner side of the end wall 202. On the opposite side of the central portion of the diaphragm is another plate 211. The central portion of both plates and diaphragm being coaxially apertured as shown in FIGURE 2 to receive the peened reduced end of a slidable valve element (plunger) 212 and draw the annularly formed flanged end 213 of said valve plunger and said diaphragm plates into an airtight assembly for unitary movement under influence of a pressure differential effective in one direction and spring-action in the opposite direction to move said valve plunger 212 to its three operating positions of control designated $a$, $b$ and $c$ as shown in FIGURE 2A, said control positions defining ranges of pressure control therebetween with position $a$ accommodating substantially free outlet flow of oil from valve chamber 154 via passage 159, thence through passage 184 through the check-valve CK² into connected conduit 64, branch duct 68 into the inlet passage 51 for return to the oil sump as shown in FIGURE 1. A series of closely generated positions defining the $a$ to $b$ range is effective to block fluid flow into chamber 182, and another series of closely calibrated positions from $b$ to $c$ is effective to produce another range of control for regulating oil flow from the main control valve MV as a function of engine torque defined in terms of vacuum efficiency created within the intake-manifold IM during engine operation, to smoothly engage the clutch FC upon depressing the accelerator pedal from its normally released position as shown in FIGURE 1 wherein high vacuum efficiency obtains in the intake-manifold while the engine is operating at idle speed to enable the vacuum-modulated diaphragm 199 to fully retract to the position of FIGURE 2 under atmospheric pressure acting on the opposite side of the diaphragm. Accordingly, such differential pressure produced in the manner described is of such magnitude that the diaphragm power-spring 209 is overcome, but upon depressing the accelerator pedal to open the carburetor throttle-valve, vacuum production within the intake-manifold IM is lowered progressively as the engine speeds up which correspondingly lowers the negative (vacuum) pressure in the chamber 182 so that the power-spring 209 can be effective to urge the diaphragm forwardly, that is to say, as vacuum is lowered in chamber 182 to substantially that of the atmospheric chamber 183 the power-spring 209 becomes progressively effective to move the diaphragm forwardly, therefore the attached plunger valve 212 as shown in FIGURE 2A. Initial movement of the diaphragm 199 moves the valve plunger 212 rather quickly to its $b$ position to momentarily arrest the clutch friction members, followed by a relatively slower movement through its $b$ to $c$ range of engaging control positions which gradually release the fluid from the annular valve chamber 154 and therefore the control chamber 113 in the clutch servo-cylinder SC to enable the power-piston 87 to move from its dashed line to its solid line position of FIGURE 3 and connected piston-rod PR, clutch throwout lever 118, and clutch pressure plate under influence of engaging springs 129 and return spring 122, to firmly engage said clutch FC as is understood.

It is important to note that the free end portion of the valve plunger 212 is formed with a reduced diameter portion 214 defining an annular fluid control space 215 and a terminal valve land (head) 216 which cooperates with the aforesaid aperture 178 to produce the aforementioned clutch engaging control valve EV. The purpose of this arrangement is to provide a valve land of substantially the same diameter as the aperture 178 in the cup-shaped member 176 that will serve to sequentially block oil flow through the aperture when the valve plunger 212 is at $b$ positions, but upon the valve land clearing the wall of the aperture 178, a restricted flow therethrough around the reduced portion 214 enables the vacuum-modulated motor VD to regulate such restricted flow under driver supervision, from the clutch servo-cylinder SC for synchronous operation therewith to produce smooth re-engaging action of the clutch FC under influence of its engaging-springs 129. As shown in FIGURES 2 and 2A, the valve plunger 212 reciprocably projects through the axial bore 195 and packing 196 in oiltight sealed relation therewith to maintain the atmospheric chamber 207 of the vacuum-modulated device VD isolated from the oil chamber 182 of the engaging-control valve EV.

Reference is again made to the aforesaid shift-lever SL and switch LS mounted thereon and controlled thereby. As shown in FIGURES 1, 1A, 9, 10 and 11, this shift-lever is of composite construction comprising the aforementioned inner member (shaft) 34 and the outer tubular member (elongated sleeve) 35, and which are manually movable as a unit in a predetermined relative relationship to effect a speed change or neutral in the transmission T. The outer sleeve 35 is axially movable relatively a limited degree to the inner shaft member 34 to operate the switch LS to its open position shown in FIGURES 1 and 9, and to its closed position as shown in FIGURE 12 wherein the clutch FC is disengaged and the shift-lever moving toward establishing intermediate speed drive as indicated by the arrow.

The upper end portion of the inner shaft 34 is slotted at 217 (see FIGURE 11), and a knob KB preferably made of moldable material such as plastic or hard rubber, is formed with a blind cavity 218 of the same size and configuration as the sleeve 35 in rectangular cross section. The upper end portions of both members 34, 35 are inserted into the open end of said cavity in spaced relation to the closed end 219 thereof, to produce a spring chamber 220 therebetween. Embedded in the closed end of said cavity is a circular guide element 221 for controlling the upper end of a normally compressed spring 222 operatively disposed in said spring chamber to react against a thrust plate 223 normally engaging the upper flush ends of both of said members 34, 35 whereby said spring is effective to axially retract the tubular member 35 relatively to the inner shaft 34 to establish the normal "locked" position of the shift-lever SL and simultaneously opening the switch LS for automatic clutch re-engagement as will be explained in greater detail hereinafter.

A pair of aligned cross bores is formed through the lower end portion of the knob KB to intersect the aforesaid cavity therein, and interfitting the upper end portion of the tubular member 35, said cross bores normally registering with the upper end of the slot 217. A cross pin 224 is pressfitted through said cross bores to freely engage said slot and thereby effect mounting of the knob KB in operating position atop the shift-lever SL, said pin 224 and slot 217 producing what may be termed a pin-and-slot connection between said members of the shift-lever. The aforesaid spring 222 being effective to bias the knob and connected tubular member 35 to the position of FIGURE 11, relatively to the inner shaft 34 to open the switch LS best demonstrated in FIGURES 1 and 9 wherein the lower end of the tubular member 35 is spaced from the flexible contact 31 mounted on the side of the inner shaft 34 as shown in FIGURE 1A. Also under such circumstances, the side channels 36, 37 are out of registry with the arcuate formation of a shift-lever gate plate GP (see FIGURES 9 and 10).

As previously mentioned, the channels 36, 37 are each formed with upper horizontal shoulders 39 and lower arcuate shoulders 40, the latter shoulders being adapted to cooperate with the arcuate gate-plate GP to maintain the switch LS closed once the shift-lever is moved from "Neutral" or from a gear-active position. The gate-plate is formed with a marginal flange which underlies a corresponding surface configuration on the underside marginal portion defining a rectangular opening 225 through the floorboard in the driver's compartment, and through which the gate-plate projects upwardly into said compartment for driver convenience in manipulating the shift-lever as shown in FIGURES 9, 10 and 11. The flanged portions on the gate-plate and floorboard are attached by means of four cap screws 227 best shown in FIGURE 10.

The upper arcuate portion of the gate-plate GP is formed with a H-slot comprising a pair of parallel slots 228, 229 connected intermediately by a cross-slot 230 for guiding shift-lever movements in establishing the different speed drives and neutral of the transmission T. The opposite extremities of the left parallel slot 228 terminate in rectangular openings 231 designated "1" and "R" corresponding to low and reverse speed drives, and the extremities of the right parallel slot 229 terminate in similar openings 232 designated "2" and "3" corresponding to intermediate (second) and high speed (direct-drive) drives, while the cross-slot 230 designates by the capital letter "N" a corresponding "Neutral" condition of the transmission T. The rectangular openings 231, 232 correspond in size and configuration to the cross section of the tubular member 35 while the thickness of the inner shaft 34 comprising the shift-lever SL, is substantially the same as the width of the parallel slots proper, best shown in FIGURE 10. Therefore, the tubular member 35 is adapted to interfit said openings for locking the shift-lever against movement from its "N" or any of its gear-establishing positions, namely; "1," "2," "3," or "R" without first pressing the knob KB downwardly to displace the cross-pin 224 into the lower end of its cooperating slot 217 as shown in FIGURE 12 wherein the lower end of the tubular member 35 is in engagement with the flexible contact 31 to close the switch LS and thereby completing the electric circuit portion to the solenoid S to move the main control valve element VE to its dashed line position of FIGURE 2 wherein oil pressure effective in the control chamber 93 is placed in communication with the control chamber 113 via the annular valve chamber 154 to operatively energize the power-piston 87 while maintaining the power-piston 88 full retracted as shown in FIGURE 3, to move to its dashed line position shown in the latter figure to disengage the clutch FC corresponding to the dashed line position of the throw-out lever 118 in FIGURE 1. Upon the shift-lever reaching its fully gear-engaged position, releasing of the switch-knob KB enables the spring 222 to automatically move the knob and connected tubular member 35 relatively to the inner shaft 34, upwardly to position the cross-pin 224 in its normal position in the upper end of the slot 217 and thereby opening the switch LS automatically as shown in FIGURES 1, 9 and 11. Opening of the switch LS interrupts the solenoid circuit resulting in de-energization of the solenoid S which releases the armature 44 and connected spool-type valve element VE for the latter to assume its solid line position of FIGURES 2 and 3 under influence of the valve return spring 156 wherein the valve land 152 overlies the oil channel 160 in fluid balancing relation thereto, and the oil outlet passage 159 is placed in communication with the annular fluid chamber 154 whereby trapped oil in the control chamber 113 is released to return through the clutch engaging-control valve EV in the manner previously explained, and connected conduit 64 back to the oil sump without cavitating the valve chamber 154, passage 159 and control chamber 113 due to the spring biased check-valve $CK^2$ maintaining the fluid pressure therein at approximately 2–3 p.s.i. of non-activating intensity.

As shown particularly in FIGURES 9 and 11, the shift-lever SL has its inner shaft 34 pivotally mounted on a shaft 235 fixed to a gate-plate mounting bracket 236. The upper portion of the bracket defines the aforesaid gate-plate GP. The pivotal lower end portion of the inner shaft 34 is formed with a bore 237 through which said inner shaft passes, and opposite marginal ends of said bore are chamfered at 238 to enable sidewise rocking of the shift-lever as is understood. The shift-lever SL is yieldably maintained in its substantially vertical "N" position as shown in FIGURES 9 and 11 by means of a pair of pliant rings 239, 240, one on each side of the chamfered portions 238 of the bore 237. If the shift-lever is moved to the right as viewed in FIGURE 11, both of the pliant rings will correspondingly deform to accommodate such positioning of the shift-lever, and also deform oppositely to accommodate leftward movement of the shift-lever, to enable positioning of the latter out of the "N" slot into alignment with the selected leg of the parallel slot corresponding to the selected speed drive to be engaged, such positioning (rocking) of the shift-lever to the right or left is restored automatically to the vertical "N" position as shown in FIGURE 11, upon release of the shift-lever under bias of the pliant rings returning to their normal configuration.

That portion of the shift-lever SL which lies below the gate-plate GP and its pivotal shaft, is disposed between the aforesaid pair of shifting arms 18, 19 also pivotally mounted on the shaft 235 and a split-retaining ring 241 engaging a complemental annular groove formed adjacent the outer end of said shaft, and is effective to stabilize the shifting arms, pliant rings and interposed pivotal portion of the inner lever shaft 34 in assembled relationship. The upper end portions of the shifting arms are formed with inturned confronting flanges 242, 243, respectively, of arcuate configuration best shown in FIGURES 1, 11 and 12. Indented in the intermediate portion of each flange, are notches 244, 245, respectively, which are selectively engageable by the inner lever shaft 34 upon selectively rocking the shift-lever SL sidewise to the left or right as the case may be, as viewed in FIGURE 11. Upon the shift-lever engaging one of these notches with the pliant rings under deformation, the corresponding leg of the aligned parallel slot in the gate-plate GP enables fore and aft movement of the shift-lever to operate the corresponding shifting arm and thereby operating the transmission gearing into the selected speed-drive active position.

The lower end portions of the shifting arms 18, 19 are connected by the aforesaid links 20, 21 to the transmission gear-actuating arms 22, 23, respectively, mounted on the exterior of the transmission cover plate 24 as shown in FIGURE 9, whereby shift-lever fore and aft movements are selectively transmitted via said notches and shifting arms to the aforesaid gear-actuating arms which are operatively connected to the shiftable elements (not shown) comprising the gear sets of the transmission T and thereby establishing the different drives and a neutral condition thereof.

The gate-plate GP is mounted on the side of the transmission housing by means of a pair of cap screws 246 (see FIGURES 9 and 11) which are employed to fix the mounting bracket thereof in vertical position on a planar surface defining a pad 247 projecting from the side of the transmission housing.

*Operational summary*

It is believed that the foregoing description considered with the drawing affords a clear understanding of the novel coaction of the various components comprising my new and improved electro-hydraulic-vacuum control system CCS. However, in the interest of further clarification, the following brief restatement is given to provide continuity of the different phases involved in the operational cycle for engaging and disengaging the clutch FC.

Assuming the clutch FC is fully engaged as demonstrated in FIGURE 1, under influence of its engaging-springs 129, and the engine E operating at idling speed (ignition switch MS closed) with the accelerator pedal 12 fully released as shown in FIGURE 1, thus driving the pump 48 at minimal pressure producing speed, and the vehicle standing in readiness to be started. Under these circumstances engine oil is being delivered from the pump output chamber 52 through passage 58 to the interrupter switch IS but at low pressure insufficient to operate said switch from its spring-closed position to open position which is set to open at vehicular speeds between 5-8 m.p.h., thence through duct 59, oil gallery port 62 and pressure regulator valve PRV via the branch duct 60, and into the control chamber 93 via branch duct 61 and interposed check-valve CK¹, all as demonstrated in FIGURES 1 and 3 wherein the power-piston 88 is fully retracted for maximum energization of the power-spring PS due to the valve land 152 blocking oil channel 160 best shown in FIGURES 2 and 3.

Also it should be noted from an inspection of FIGURES 1, 1A, 2, 2A and 3, that the power-piston 87 in the clutch servo-cylinder SC has moved to its dashed line position of FIGURE 3 to fully disengage the clutch FC, and the shift-lever SL occupies its "N" position (see FIGURES 1, 9 and 10), and the switch LS open as shown in these three figures. The vacuum-modulated motor VD is under high vacuum being produced in the engine intake-manifold IM due to the engine operating at idling speed with the throttle-valve 16 only "cracked." This high vacuum condition in the vacuum chamber 206 creates a pressure differential across opposite sides of the power-diaphragm 199 to fully retract the same to the position shown in FIGURE 2 wherein the clutch engaging-control valve EV (valve plunger 212) is fully retracted to position a (see FIGURE 2A) and the power-spring 209 at maximum energization.

Furthermore, movement of the power-piston 87 to its dashed line position of FIGURE 3 to disengage the clutch FC has resulted from the solenoid S being energized and thereby causing movement of the armature 44 and connected main valve element VE to the dashed line position of FIGURE 2 because that portion of the electric circuit EC is energized due to the ignition switch MS and interrupter switch IS being closed, such movement of the valve element VE unblocks the oil channel 160 for communication with the annular valve chamber 154 which continuously communicates with passages 162, 165, 163 connected to the control chamber 113 thus interconnecting the control chambers 93, 113 whereby the power-piston 88 is maintained in its fully retracted position for maximum energization of the power-spring PS while the power-piston 87 is maintained in its protracted position demonstrated by dashed lines in FIGURE 3, for full clutch disengagement. The foregoing description completes what may be termed an initial operating phase of my clutch controlling system CCS to disengage the clutch FC while the engine E is operating at idle speed and the vehicle standing in readiness to be driven from its parked position.

The second operating phase of my clutch controlling system CCS is characterized by first depressing the shift-lever knob 217 to close the switch LS, but since the main valve operating solenoid S is already energized by closed condition of the interrupter switch IS, the solenoid S being under such condition does not contribute any further function other than the one already performed of moving the main valve element VE to its dashed line position of FIGURE 2. Depression of the shift-lever knob KB displaces the side channels 36, 37 in registry with the marginal sides of the arcuately formed slots in the gate-plate GP as shown in FIGURES 1, 9, 10 and 11 which releases the composite shift-lever SL for movement fore and aft into the selected slot to engage the corresponding starting gear of the transmission T which, for example, can be second (intermediate) gear designated by the indicium "2" on the gate-plate GP as shown in FIGURE 10 and which gear is in process of being rendered active as shown in FIGURE 12. Upon the shift-lever SL being fully moved through its selected parallel slot with the oppositely disposed arcuate shoulders 40 in wiping contact with the underside of the opposed marginal portions, respectively, defining the selected slot, to prevent fortuitous opening of the switch LS by inadvertent releasing of the knob KB prior to the selected gear becoming fully engaged, thus permitting the lower locking end portion of the tubular member 35 to displace upwardly into engagement with the corresponding rectangular opening 231 to lock the shift-lever SL in its gear-active position and simultaneously accommodating switch LS to open automatically under influence of the return spring 222 best shown in FIGURES 1 and 11 wherein the lower end 38 of the tubular member 35 is spaced from the contact 31, it being recalled that the lower end 38 of the tubular member produces the ground for completing the shift-lever portion of the electric circuit EC.

The above described second operating phase completes what may be termed the conditions obtaining to place the transmission T "in-gear" preliminary to starting the vehicle.

The third operating phase of my clutch controlling system CCS is effective for starting the vehicle by initially depressing the accelerator pedal 12 from its fully released engine idling position of control to its first dashed line position shown in FIGURE 1, such depressing of the accelerator pedal being effective to increase engine speed by correspondingly opening the throttle-valve 16 and thereby increasing oil pressure delivery from the pump 48 into its control chamber 52 and connected conduits (ducts) aforesaid. Upon depressing the accelerator pedal, vacuum efficiency is correspondingly lowered in the intake-manifold IM with the consequent progressive releasing of the energized power-spring 209 to effect protractive movement of the clutch-engaging valve plunger 212 from its $a$ position through its $b$ and $c$ ranges of oil flow control defined by the telescopic projecting of the terminal valve head 216 through the oil flow control aperture 178 during an engine speed corresponding to vehicular speed of approximately up to 8 m.p.h. in the starting gear, that is to say, that as engine speed increase above idling speed to produce in the starting gear a vehicular speed of approximately 8 m.p.h., the power-diaphragm 199 in the vacuum-modulated motor VD is protracted from its normally fully retracted position shown in FIGURE 2 which corresponds to the conditions shown in FIGURE 1 when the engine is running (ignition switch closed), under influence of the power-spring 209 progressively expending its energy to first operate the clutch-engaging plunger 212 through its $a$ to $b$ range, and then upon further increase in engine speed, the diaphragm 199 moves further under influence of the power-spring 209 through its $b$ to $c$ range. Accordingly, extent of release of the power-spring 209 is dependent on the degree of pressure differential present on opposite sides of the diaphragm 199 as defined by the extent of the throttle-valve opening in relationship to vacuum efficiency in the intake-manifold IM, the latter being readable in terms of torque produced by the engine.

The vehicle is now operating in its fourth phase of clutch control wherein said clutch is in firm engagement for maximum torque-transmitting efficiency, and under which condition the accelerator pedal 12 may be released at will without interrupting such engagement thus avoiding momentary "free-wheeling" and attendant loss of compression power-braking from the engine in controlling deceleration of the vehicle. This lock-up drive between the engine and vehicle drive wheels is made possible by the pressure from said control chamber 52 reaching a magnitude effective to open the pressure-reponsive switch IS which brings into operation the manual control by the main valve element VE whereby the shift-lever SL is now activatable to control the transmission T for normal driving according to conditions of the road so that upshifting and downshifting may be made at the will of the driver until initial control of the anticipated shifting movement by depressing the knob KB to close switch LS for disengagement of the clutch FC to facilitate a gear-change, and automatic re-engagement of the clutch upon completion of the selected shift responsive to release of the knob KB.

As the accelerator pedal 12 is depressed from its released position and the vehicle underway in its top speed drive (direct-drive), the starting operation above described is phased out much more rapidly in an almost uninterrupted sequence in synchronism with the progressive depressing of the accelerator pedal. Engine speed mounts rapidly for supplying the necessary starting torque which builds up oil pressure delivery from the pump 48 at the same rate to open the interrupter switch IS and thereby interrupting that portion of the electric circuit EC which includes the solenoid S thus automatically releasing the main valve element VE to move automatically under influence of spring 156 back to its normal solid line position shown in FIGURES 2 and 3. This latter position of the valve element VE, isolates the control chamber 93 from the control chamber 113 in the clutch servo-cylinder SC without interrupting communication of the latter chamber with the annular valve chamber 154, passage 159 and the oil chambers 182, 183 which are connected when the engaging-control valve plunger 212 is withdrawn under influence of pressure differential created by vacuum on one side of the power-diaphragm 199, from the flow control aperture 178 to normal position $a$ as shown in FIGURES 2 and 2A. Under these conditions, as the engine is speeded up, excess pressure delivery of oil to the control chamber 93 is limited by such excess returning to the oil sump 49 via the pressure-regulator valve PRV, branch duct 68, inlet passage 51 which leads to the oil sump as shown in FIGURE 1. At the same time the engine is speeding up, vacuum efficiency in the intake-manifold IM is being correspondingly lowered and communicated to the vacuum chamber 206 of the vacuum-modulated motor VD to progressively release the diaphragm 199 for movement under influence of the power-spring 209 to control movement of the valve plunger 212.

Under the aforesaid conditions of movement of the valve plunger 212, when the terminal head 216 thereof enters the flow control aperture 178, oil return from the control chamber 113 in the clutch servo-cylinder SC is blocked momentarily from the annular valve chamber 154 and passage 159 as clearly demonstrated in FIGURE 2A, but upon sufficient engine speed being attained to approximately 8 m.p.h. vehicular speed in the starting gear, the interrupter switch IS opens to break the solenoid portion of the electric circuit EC, and thereby de-energizing the solenoid winding with consequent return of the valve element VE to its solid line position by spring 156 as shown in FIGURES 2 and 3 and thereby displacing the valve land 151 to the position wherein outlet passage 159 is again placed in communication with flow control aperture 178 so that the latter upon further protraction through its $b$ to $c$ range can restrictively open the aperture 178 behind the annular oil space 215 adjacent the valve head 216 to meter oil flow return from the clutch servo-cylinder SC control chamber 113 through the passage 184, check-valve CK² and conduit 64 back to the oil sump 49 for re-circulation by the pump 48 as is understood.

The aforesaid metered release of the oil from the control chamber 113 provides for smooth engagement of the clutch FC under influence of its engaging-springs 129, such spring-engaging action having a corresponding relationship to the amount of torque defined by the open condition of the throttle-valve 16. Stated differently, engine torque is read in terms of vacuum efficiency in the intake-manifold IM therefore in the vacuum-modulated motor VD. Therefore, as engine torque increases, a correspondingly protractive movement of the valve plunger 212 occurs from $a$ position (see FIGURE 2A) to $b$ position wherein the aperture 178 is momentarily blocked by the plunger head 216, into oil chamber 183 and connected angular passage 184, thence through the check-valve CK², conduit 64 back into the oil sump for re-circulation by the pump 48. It will be noted from FIGURE 1 that the return oil in conduit 64 passes through the branch conduit 68 into the inlet passage 51 and thence into the oil sump 49. The spring-biased check-valve CK² is set to maintain a non-activating pressure on the oil in the oil chambers 182, 183, outlet passage 159 and annular valve chamber 154 at approximately 2–3 p.s.i. with the excess pressure passing through the check-valve for drain-off into the oil sump as explained above.

It is thus seen that driver depressing of the accelerator pedal from released position provides for smooth clutch engagement under influence of the clutch-engaging springs 129 for starting the vehicle, and after the vehicle is underway at speeds at or above 8 m.p.h., the interrupter switch IS opens automatically to place further clutch engaging-control and engaging operations under sole control of the driver through the shift-lever SL as will now be explained in detail.

It is important to note at this point that upon initially opening the throttle-valve 16 to speed up the engine E, that vacuum conditions obtaining in the intake-manifold IM fall perceptibly to release the vacuum-diaphragm 199 for power-spring movement to position $b$ wherein oil flow through the aperture 178 is momentarily blocked should the driver halt accelerator pedal depression at this point, and thereby conditioning the restrictive oil flow range of movements between $b$ and $c$ as shown in FIGURE 2A to be effective for smooth re-engaging-action of the clutch FC as is understood.

It is thus seen that driver depressing of the accelerator pedal 12 from released position after engaging the starting gear in the transmission T, provides smooth clutch-engaging-action to start the vehicle without jerking, under influence of the engaging-springs 129, and that after the vehicle is underway at speeds at or above 8 m.p.h., the interrupter switch IS opens to interrupt that portion of the electric circuit EC which includes the solenoid S, and thus placing further clutch operations incident to manual speed-changes in the transmission T under sole control of driver manipulation of the knob KB and switch LS as will now be explained.

Reference is now made to FIGURES 1, 1A, 9, 10, 11 and 12, wherein I have disclosed my shift-lever controlled switch LS in operative association with the tubular member 35 of the composite shift-lever LS. Assuming that the vehicle is driving at speeds at or above 8 m.p.h., and the driver desires to shift from the starting gear into a higher speed drive such as high speed direct-drive designated "3" on the gate-plate GP in FIGURE 10. To execute this speed change all the driver needs do is to release the accelerator pedal 12 to the position shown in solid lines in FIGURE 1 which induces high vacuum in the intake-manifold IM with consequent retraction of the diaphragm 199 (see FIGURE 2) to position the clutch-engaging valve plunger 212 in its fully retracted position $a$ wherein the oil flow control aperture 178 is unrestricted. Assuming the shift-lever LS is in "2" position corresponding to activation of second (intermediate speed drive of the transmission T, the driver would now depress the knob KB which closes the switch LS and thereby completing the electric circuit from the battery B to the solenoid S for movement of the main valve element VE thereby to its dashed line position of FIGURE 2 which automatically connects the two control chambers 113, 93 in the clutch servo-cylinder SC to activate the power-piston 87 to disengage the clutch FC in the manner previously described while at the same time, oil pressure flow through the control chamber 93 is maintaining the power-piston 88 in its fully retracted position and therefore the power-spring PS at maximum energization as shown in FIGURE 3. Next, the driver while holding the knob KB down, moves the shift-lever SL from its "2" position through its corresponding slot of the gate-plate GP across neutral slot and then aft into the slot corresponding to the "3" position. During such movement of the shift-lever the switch LS is maintained closed automatically as the lever is in shifting motion by the arcuate shoulders 40 in engagement with the underside opposite marginal portions defining the slots involved in the selected shift movement, and by manual pressure on the knob KB while the shift-lever is positioned at the rectangular opening terminating the slot leading to "2" and also while the lever is passing through the neutral slot. Therefore, the switch LS cannot open even though the driver may inadvertently release the knob KB during a shifting operation, premature opening of said switch by its spring 222 enables the clutch-engaging springs 129 to close the clutch FC with consequent "raking" of the positive engaging elements of the transmission T and possible damage thereto. Upon the shift-lever being established in high speed drive position "3," the driver releases the knob KB and thereby opens the switch LS under influence of spring 222 for the lower end portion of the tubular member 35 to project into the rectangular opening 227 at the end of the gate-plate slot 226 corresponding to high speed engaged condition. This automatic opening of the switch LS interrupts the included portion of the electric circuit EC to the solenoid S with consequent de-energization of its winding 42 to release its armature 44 to return under influence of spring 156 to the solid line position shown in FIGURES 2 and 3 wherein control chambers 93, 113 are isolated, and since valve chamber 154 is continuously in communication with the outlet passage 159, and the flow-control aperture 178 fully open, the oil trapped in control chamber 113 is released for excursion through said aperture 178, chamber 182, angular passage 184, check-valve CK² into conduit 64 for return to the oil sump 49, thus enabling the clutch-engaging springs 129 to re-engage the clutch FC automatically prior to the driver again depressing the accelerator pedal 12 for resumption of vehicular drive in the newly selected high speed drive.

Accordingly, the clutch FC can be opened and closed automatically for speed changing operations at any vehicular speed at or above 8 m.p.h. approximately by merely depressing and releasing the knob KB to close and open, respectively, the switch LS, and that during shifting movement of the shift-lever SL from and to "N" position, the switch LS is automatically maintained closed to prevent fortuitous opening of the clutch FC with resultant "freewheeling" of the vehicle (loss of engine-braking). In this manner "raking" of the positive shiftable elements comprising the transmission gearing is avoided with possible damaging of said gearing, thus providing quiet transition from one speed to another and to neutral under manual control of the driver.

Reference is now made to my novel and improved hydraulic clutch-disengaging mechanism comprising that portion of the servo-cylinder SC having control chamber 93 and power-piston 88 reciprocably disposed therein to energize the power-spring PS and utilize such energization to effect automatic clutch disengagement upon turning the ignition switch "on" when the vehicle is parked "in-gear," the engine E at rest and roll of the vehicle applying a coasting load on the gearing of the transmission T as a function of resistance produced by compression-braking from the engine, thus binding the mating positive engaging-elements comprising the gear set in which the vehicle is parked, and thereby preventing return of the shift-lever SL to "N" position for release of the engine for starting so that normal control of the clutch FC can be effected by the pump 48. Under such parking conditions, the vehicle is rendered inoperative until a push-start can be obtained, but with my novel clutch-disengaging mechanism above described, the driver merely has to turn the ignition switch "on" which first opens the clutch, and then enables the engine to start. When the driver turns the ignition switch "on," solenoid S becomes energized to move the valve element VE to its dashed line position shown in FIGURES 2 and 3 wherein the control chamber 93 is placed in communication with the control chamber 113. The oil trapped in control chamber 93 is under pressure exerted by the power-spring PS, the latter displacing the oil when relieved by the aforesaid operation of the valve element VE, into control chamber 113 to move the power-piston 87 to operate the clutch FC into disengagement as previously explained in detail. This disengagement of the clutch in response to closure of the ignition switch releases the shift-lever for movement fore or aft to render a selected speed drive active and inactive as the case may be, and upon returning the shift-lever to "N" position as shown in FIGURE 10 the engine can be started, whereupon oil pressure flow from the pump 48 re-energizes the power-spring PS by oil pressure retraction of the power-piston 88 without interrupting the working pressure in control chamber 113 effective to hold the power-piston 87 in its clutch-disengaging dashed line position of FIGURE 3. The clutch FC and transmission T are now conditioned for normal control by the driver to start the vehicle as previously explained in detail.

It is, therefore, noteworthy that my electro-hydraulic-vacuum control system CCS for a friction engaging device such as the disclosed clutch FC, is so arranged that the included dual-piston hydraulic clutch actuator DA provides a unitary and compact assembly for normal disengaging and re-engaging operations of said friction device while the vehicle is standing with the engine running, and to facilitate manual speed-changing of the transmission T; the same pressure force utilized for the friction device disengagement serves also to charge the auxiliary actuator comprising the power-piston 88 and spring PS for disengagement of the friction device at will by enabling the auxiliary power-piston 88 to displace oil under pressure against the power-piston 87 of the other actuator operatively connected to said friction device and thereby moving both power-pistons as a unit to effect disengagement of the said friction device when the vehicle is parked "in-gear" under coasting load torque produced by roll of the vehicle, to free the shift-lever for movement to "N" position for release of the engine for starting, whereupon normal disengaging and re-engaging control of said friction device is restored to the power-piston 87 connected thereto.

While the vehicle is parked "in-gear" as above described, the control chamber 93 is maintained charged and the power-spring PS under maximum energization due to confinement of oil in the latter chamber by the aforesaid valve land 152 in overlapping relationship with respect to the oil channel 160 and check-valve CK². Under such conditions, it is obvious from an inspection of FIGURE 3 that the power-piston 88 under influence of the power-spring PS is capable of displacing fluid from chamber 93 under control of the main valve element VE in operating position of control shown in dashed lines, into chamber 113 and thereby moving the power-piston 87 to its dashed line position to effect disengagement of the clutch FC, however, such disengaging-action can be jointly effected by the disclosed fluid and mechanical means operative between said power-pistons, or separately by either of these means. That is to say, the invention contemplates use of the plunger 73 or fluid-displacement between said power-pistons or either of these force-transmitting means separately, to effect clutch disengagement when coasting load is imposed on a motor vehicle and the like parked "in-gear" condition of the transmission T which prevents returns of the shift-lever to "N" position for release of the engine so that the latter can be started to restore normal oil pressure control from the pump 48 to the dual-cylinder clutch actuator DA.

It is further important to note that should the knob KB be released while moving the shift-lever SL from the neutral slot in the gate-plate GP, no damage can occur to the transmission gearing since the locking channels 40 in engagement with the gate-plate selected slot prevents fortuitous opening of the switch LS until the selected speed drive is fully engaged and, of course, should the knob KB be released while the shift-lever occupies "N" position, the gearing would be disengaged therefore no damage would result by re-engagement of the clutch FC, it being a salient feature of the present invention to prevent fortuitous clutch-engagement during shift-movement fore and aft of the shift-lever toward or away from the different gear-engaged positions, namely: "1," "2," "3," "R," to engage and disengage the different speed drives. Should such inadvertent clutch-re-engagement occur during a speed-change, meshing positive elements comprising the selected gear set would cause "raking" between these elements with possible damage thereto, however, with my novel positive means for preventing clutch-re-engagement should the driver release the knob KB during a speed-changing operation, damage to the transmission T cannot happen from closing the clutch FC before the selected gear is engaged, such means being disclosed as the arcuate shoulder 40 on the tubular member 35 which cooperate with the marginal underside portions of the gate-plate slots hereinbefore fully explained.

The present invention is primarily adapted for use with spring-engageable friction clutches of the type under consideration, however, it may be operatively associated with other conventional types such as those which utilize fluid pressure to effect engagement and spring means for disengaging the clutch. Therefore, I desire to make it manifestly clear that my present novel and improved clutch controlling system CCS may be readily adapted to either of the foregoing types of clutches.

Interaction of the control components shown in FIGURE 1 produces a novel and patentable arrangement and features of construction and operation of the cooperating elements comprising said components and more efficient cooperation of such elements particularly during the critical initial stage of clutch plate contact preliminary to firm engagement of the clutch members, thus enabling the driver to predictably control the final engaging movements of the clutch plates into firm engagement for maximum torque-transmitting efficiency.

Therefore, the present clutch controlling system provides simplified and positive means for establishing the clutch friction members in initial contact, "slipping" engagement, and final firm engagement in response to the novel interposition of the aforementioned clutch engaging-control valve EV which is cooperable with the main control valve MC operable under manual driver supervision to control the aforesaid phases of clutch operation. Upon the clutch members becoming firmly engaged, operation of the accelerator pedal 12 through its range of throttle control is ineffective to cause clutch disengagement (freewheeling) at vehicular speeds at or above 8 m.p.h., for example. This contributes to economical operation of the vehicle, such disengaging operation of the clutch requiring manual manipulation of a portion (knob KB) of the shift-lever SL preliminary to fore or aft movement of the latter to establish the transmission T in its "N" or selected drive-activating conditions indicated on the gate-plate GP in FIGURE 10.

While I have disclosed in the present application, the main control valve MV in association with my novel engaging control valve EV, the present invention contemplates that other types of engaging-control valves patented by me and others working in the art to which the invention relates, may be employed in lieu of the disclosed valve EV for controlling fluid flow from the main control valve MV without impairing the function of the latter, or its patentability. It is also important to note that the vacuum connection between the intake-manifold IM and vacuum chamber 206 may take the form of a linkage between the plunger valve 212 and accelerator pedal 12 and thereby eliminating the vacuum-modulated device VD.

Furthermore, FIGURE 2 discloses the engaging-control valve EV under vacuum energization (pressure differential) which is effective to position the valve plunger 212 in its "a" position, but in FIGURE 1, this same valve element occupies its "c" position due to the engine E being at rest (ignition switch "off"). Thus the plunger valve 212 is in its c position under influence of spring 209 since vacuum production by the engine has ceased.

In the event the vehicle is parked "in-gear" on a grade inducing roll of the vehicle or other forces acting thereon, the clutch disengaging power-piston 88 is always energized under maximum energization by its power-spring PS to effect clutch disengagement on command from the driver by turning the ignition switch "on" prior to starting the engine E. Closure of the ignition switch MS completes that portion of the electric circuit EC which includes the main valve operating solenoid S to energize its winding for movement of its armature 44 to place the main valve element VE in its dashed line position of FIGURE 3 wherein the control chambers 113, 93 are interconnected and the clutch engaging-control valve EV isolated, to enable the oil confined in the control chamber 93 to be displaced via said main valve element VE into the control chamber 113 by said power-spring PS to operate power-piston 87 including the plunger 73 effective to assist in transmitting thrust between said power-pistons to effect disengagement of the clutch FC in the manner already explained in detail.

The invention contemplates that thrust transmission between said power-pistons may be solely hydraulic or mechanical or a combination of both, to open the clutch FC to release the engine from coasting-load torque produced by roll of the vehicle or otherwise when left "in-gear" and the engine stopped, and that upon starting the engine, the pump 48 becomes instantly effective to restore the power-piston 88 to its fully retracted position corresponding to maximum energization of the disengaging power-spring PS, out of interference with reciprocable movements of the other power-piston 87 connected to operate the clutch FC under normal vehicle operations, said power-spring and power-piston 87 being maintained in fully energized positions as shown in FIGURE 3 by oil pressure trapped in control chamber 93 for "in-gear" parking or for oil pressure flow through control chamber 93 into the control chamber 113 when the latter is effective to disengage the clutch FC as is understood.

The foregoing description is believed to set forth clearly the achieving of the various stated objectives of the invention, and to describe the advantageous results provided.

Considering the terminology used in the foregoing description and in the appended claims, the identifying expressions and/or terms employed are intended to convey meanings which include the range of reasonable equivalents in the patent sense, such as "clutch," "friction clutch," "friction engaging device," "clutch members," "pressure plate," "disc," "drive and driven members," are intended to designate a friction-type clutch or coupling serving to transmit torque from a source of torque production to a variable change-speed drive, or modifications thereof to serve the same purpose. The terms "fore,"

"aft," "forward," "rear," "rearward," "top," "bottom," "end," "left," "right," and other directional words or characters except those referring to direction of vehicular or oil flow movement, are intended to have only relative connotation for convenience in describing the structure as displayed on the drawing, and are not intended to be interpreted as requiring any particular orientation with respect to environmental structure in which the present invention may be associated for its novel advantages to be realized to advance the art to which the invention relates. Automatic and manual control of the clutch actuator DA therefore the friction device FC, is operatively related in part with separate functions of the fluid and spring pressure controlled interrupter switch IS and the shift-lever controlled switch LS, respectively, that is, the interrupter switch conditions automatic disengagement and re-engagement of the friction device FC while the shift-lever switch provides manual control over such device operations under driver supervision.

I wish it to be understood that my invention is not to be limited to the specific constructions and arrangements illustrated and described only insofar as the claims may be so limited, as it will be apparent to those skilled in the art to which the invention relates that changes may be made without departing from the principles of the invention as set forth in the terms of the subjoined claims.

Having thus described my invention, I claim:

1. A power-supply system including a vehicular driving internal-combustion engine, a pump driven by said engine, a drive member driven by said engine, a driven member, mechanism for providing a power train having neutral and a plurality of selectively engageable drives and including a friction engaging device for completing the power train upon engagement of a selected drive thereof, means operable for engaging said friction device, manual means operable for selectively establishing said power train in an engaged drive or neutral, a control device operable in synchronism with the selective establishing of neutral and engageable drives of said power train in response to selectively operating said manual means at will, a hydraulic clutch-servo characterized by a cylindrical casing open at opposite ends and divided intermediately by a partition wall to produce a pair of opposing fluid chambers, a pair of detachable closure heads for said open ends, respectively, and a pair of power-pistons movably disposed in said fluid chambers, respectively, and serving to divide each fluid chamber into a fluid working control chamber and a constant pressure atmospheric chamber, said control chambers being connectible to the output pressure side of said pump, one of said power-pistons being adapted to control normal engagement by said engaging means and disengagement of said friction device in driving the vehicle when said manual means are free to operate said power train as aforesaid, and the other power-piston serving as auxiliary means only to disengage the friction device when normal control thereof by said one power-piston is ineffective due to the engine being at rest under coasting-load torque impressed on an engaged drive when the vehicle is parked "in-gear," as a function of opposition by compression power-braking from said engine to vehicular movement, fluid passage means between said control chambers, said passage means being controllable by said control device to connect said control chambers to move their respective power-pistons as a unit in one direction only to disengage said friction device, means energizable by said other power-piston under said pump output pressure to move said one power-piston via said other power-piston upon releasing said output pressure from the control chamber of the latter into the control chamber of the one power-piston, and thereby effecting said auxiliary disengagement of the friction device, said output pressure in said control chamber in which said other power-piston moves, being effective to maintain said energizable means energized despite normal control of the friction device by said one power-piston when said engine is operating, and means effective for conditioning said engine to start for controlling said control device to open said passage means for establishing fluid communication between said control chambers whereby the one power-piston is effective to control normal engagement and disengagement of said friction device, while the other power-piston is maintained fully retracted to maintain said energizable means at maximum energization to effect disengagement of said friction device upon coasting-load torque being effective on said power train in a selected "in-gear" drive with the engine and vehicle at rest, said last-mentioned disengagement of the friction device being effective to remove said coasting-load torque from the engaged drive and thereby releasing said manual means to neutralize such engaged drive to enable starting the engine whereupon normal control of said friction device under said manual means is effective.

2. A power-supply system constructed in accordance with claim 1 in which said pump is the oil pump driven by the engine, and which serves to pressure lubricate the working parts of the engine and including a pressure regulating valve for establishing maximum pressure output by said pump, and for providing pressure requirements for lubricating said engine parts before any oil is diverted for clutch-servo actuation.

3. A power-supply system constructed in accordance with claim 1 in which said power train is a synchromesh change-speed gearbox.

4. A power-supply system constructed in accordance with claim 1 in which said manual means comprise: an energizable electric circuit including a solenoid having an armature movable in response to energization of its winding, to move said control device to a position connecting said control chambers, and a switch device movable to complete said electric circuit in response to relative manual movement of a portion of a shift-lever adapted to engage said disengage said power train upon said friction device being disengaged in response to said portion being moved relatively.

5. A power-supply constructed in accordance with claim 4 in which said control device is a control valve comprising a longitudinally blind bored casing mounted on the exterior of said clutch-servo casing, a spool-type valve element slidably mounted in said blind bore and formed with a pair of spaced valve lands defining an annular fluid chamber therebetween, a stop element defining the blind end of said bore and engageable by one end of said valve element to establish normal operating position thereof, the other end of said valve element being connected to the armature of said solenoid for movement as a unit when the winding thereof is energized, for establishing a different control position of said valve element, a normally compressed spring adapted to bias said valve element and connected solenoid armature toward normal position when said solenoid winding is de-energized, an energizable electric circuit including said solenoid winding a pair of fluid passage means passing in spaced relation through the casing of said control valve and casing of said clutch-servo for interconnecting said valve bore with said control chambers, respectively, and wherein the passage means of said pair between said valve bore and control chamber of said other power-piston are controllable by one of said valve lands to disconnect and connected said valve chamber to the last-defined control chamber, and the other passage means of said pair are adapted to maintain communication between said valve chamber and the control chamber of said one power-piston, and a fluid passage leading from said valve bore and controllable by said other valve land to connect and disconect said valve chamber to and from said fluid passage.

6. A power-supply system constructed in accordance with claim 5 including an engaging-control valve operably activatable from normal position accommodating disengagement of said friction device through a series of decreasingly restrictive regulating positions for controlling the aforesaid engaging means to engage said friction device under operator supervision, and comprising a valve body mounted on the exterior of said valve casing, a first valve chamber in said valve body communicating with said fluid passage in said valve casing, a second valve chamber coaxial with respect to said first valve chamber and isolated therefrom by a partition wall provided with a central flow control aperture, a wall integral with said valve body and adapted to close the opposite end of said second fluid chamber, an axial bore through said end wall in coaxial relationship to said control aperture, a plunger-type valve element having an annular fluid control space terminating in a control head slidably disposed in said axial bore and normally projecting into the first valve chamber to position said control head in spaced relation to said control aperture, a vacuum motor having a casing provided with a flexible power-diaphragm and a power-spring adapted to bias said diaphragm in one direction, a vacuum chamber and an atmospheric chamber in said casing separated by said diaphragm, a connection between the central portion of said diaphragm and end of said plunger valve element opposite said terminating control head whereby the latter and said diaphragm move as a unit in both directions, a vacuum conduit interconnecting said vacuum chamber with the engine intake-manifold to retract said diaphragm and thereby establishing said power-spring at maximum energization during idling speed operation of the eninge with resultant high vacuum efficiency in said intake-manifold, an accelerator pedal for controlling a throttle-valve of a carburetor for feeding fuel-mixture into said intake-manifold, said throttle-valve when in engine-idling speed control with the accelerator pedal released, creating said high vacuum efficiency, depressing of said accelerator pedal with corresponding opening of said throttle-valve being effective to lower vacuum efficiency in said intake-manifold and thereby correspondingly lowering the vacuum in said vacuum chamber to progressively release said power-spring to move said plunger valve element whereby the terminating control head enters said control aperture to momentarily block fluid flow from said first valve chamber to the second valve chamber when said spool-type valve element is in normal operating position connecting the aforesaid annular valve chamber with said fluid passage and isolating the control chamber of said other power-piston from said annular valve chamber, and through said series of engaging control fluid restrictive positions provided by relative movement of said annular fluid space on said plunger valve with respect to said control aperture, to control engagement of said friction device, thus vacuum efficiency prevailing in the engine intake-manifold is transmitted to said vacuum motor to regulate engagement of the friction device in accordance with the torque output of said engine read in terms of vacuum efficiency produced in the intake-manifold during engine operation under control of said throttle-valve.

7. A power-supply system constructed in accordance with claim 1 in which said energizable means are a power-spring adapted to move said other power-piston upon release of fluid pressure from its associated control chamber under control of said manual means.

8. A power-supply system constructed in accordance with claim 1 in which said partition wall separating said pair of control chambers is axially bored to slidably support an element adapted to transmit thrust from the other power-piston to the one power-piston in cooperation with or independently of fluid displacement by said other power-piston to move said one power-piston as a unit in one direction to effect disengagement of said friction device.

9. A power-supply system constructed in accordance with claim 5 in which said manual means comprise: a composite shift-lever having a pair of elongated telescopically-related inner and outer lever-members with the inner member pivotally mounted on a shaft fixed to the side of a housing for said power train, said pivotal mounting providing fore and aft and lateral movements of said shift-lever, means providing limited relative longitudinal movement of the outer member with respect to the inner member and connected to the former is a manual element, a normally compressed spring having interposition with respect to said manual element and said inner member to bias the former relatively to the latter member toward normal position, a gate-plate formed with an H-pattern slotted arrangement through which the lower portion of said shift-lever projects from its pivotal mounting for guiding said shift-lever in effecting engagement and disengagement of said engageable drives, a driver compartment floorboard, an opening in said floorboard for reception of said gate-plate, means for attaching said gate-plate to said floorboard, a pair of side channels defining the lower end portion of said outer member below said gate-plate, each of said channels being characterized by a horizontal straight shoulder and a spaced arcuate shoulder for the latter to cooperate with the underside marginal portions defining said slotted arrangement when said manual element is depressed to take up its limited relative movement and thereby disposing said channels in alignment with that portion of the gate-plate proper which defines the selected slot for accommodating movement of said shift-lever to engage the selected drive, an enlarged opening defining the terminal portion of each slot aforesaid, and of the same configuration substantially as the outer member in cross section, said openings being adapted to receive that portion of the outer member below the arcuate shoulders aforesaid, to lock said shift-lever in drive engaged position, a switch contact insulated from and mounted on the side of the inner member below the last-defined portion of the outer member, the extreme end of said last-defined portion forming a ground connection and thereby cooperating with said switch contact to produce a shift-lever controlled switch device, with said last-defined portion normally spaced from said switch contact to open said switch device, and when said manual element is depressed as aforesaid, said last-defined portion on the outer member engages the switch contact to close said switch device and at the same time presents said side channels for reception by the gate-plate portions defining the slotted arrangement accommodating engagement of the selected drive, a cross slot intermediate said H-pattern slotted arrangement defining neutral position of said shift-lever, said cross slot being engageable by the lower end portion aforesaid of said outer member to prevent fortuitous movement of said shift-lever to engage a selected drive prior to depressing the manual element, a conductor leading from said switch contact for connection to one end of said solenoid winding whereby completion and interruption of said conductor circuit energizes and deenergizes, respectively, the solenoid winding to move the said spool-type valve element between normal and operating positions, respectively, to control said one power-piston to disengage and accommodate re-engagement by said engaging means of said friction device in synchronism with movement of said manual element between the limits of its relative movement aforesaid.

10. A power-supply system constructed in accordance with claim 9 including a pressure-sensitive switch device responsive to pump output pressure opposed by a normally compressed spring, to unbridge and bridge, respectively, a pair of fixed contacts to open and close, respectively, said switch device, one of said contacts being grounded and the other contact connected to a conductor which intersects the electric circuit to close said circuit when said contacts are bridged under influence of said spring, to energize said solenoid, whereby when the pump is deliverying a predetermined range of output pressure said spring is effective to close said switch device with resultant energization of the solenoid winding to move its armature and connected spool-type valve element to its operating position wherein said friction device is disengaged automatically and capable of being re-engaged subsequently under control of said engaging-control valve upon said pressure-sensitive switch device opening in response to a predetermined pressure above said predetermined pressure range, said open condition of said pressure-sensitive switch device also serving to condition said manual means to effect selective drives in said power train while said vehicle is in motion, in synchronism with disengagement and re-engagement of said friction device upon closing and opening, respectively, of said shift-lever controlled switch as aforesaid.

11. A hydraulic servo-mechanism for disengaging and accommodating re-engagement of a friction engaging device, incluuding means for supplying pressurized fluid, comprising a fluid chamber enclosure open at opposite ends and provided with a medial transverse partition wall dividing said enclosure into a pair of coaxially arranged opposing fluid pressure chambers in tandem, a power-piston slidably mounted in each of said pressure chambers and serving to divide each chamber into a control (working) chamber and an atmospheric pressure chamber, a detachable closure head for closing each of the open ends of said chamber enclosure, respectively, a central aperture through the closure head of one of said pressure chambers, a power-spring mounted between the closure head of the other pressure chamber and one of said power-pistons slidable therein to protract the latter to displace fluid from its cooperating control chamber, a fluid conveying conduct between said pressure supplying means and the last-defined control chamber and which includes an interposed check-valve under spring bias in one direction to close the same to prevent back flow from said last-defined control chamber, a control valve including a valve body mounted on the exterior of said chamber enclosure, and having a longitudinal bore, fluid pasasge means interconnecting said valve bore with the control chamber associated with said one power-piston, another fluid passage means interconnecting said valve bore with the other control chamber associated with said other power-piston, a spool-type valve element slidable in said valve bore between two limits defining normal and operating positions thereof, respectively, said valve element being formed with a pair of speed valve lands which slidably interfit said valve bore and an intermediate reduced portion defining an annular valve chamber between said valve lands in continuous communication with said other passage means, one of said valve lands being selectively effective to close and open said first-defined passage means in response to slidable movement of said valve element between normal and operating positions, respectively, means for moving said valve element btween its normal and operating positions for normal engagement and disengagement of said friction device under said other power-piston, manual means for controlling said moving means at will, and automatic means having an operating spring responsive to a predetermined pressure range from said pressure supplying means for controlling said moving means to move said valve element to its operating position only for disengaging said friction device independently of said manual means, in response to displacement of fluid from the control chamber associated with said one power-piston via said annular valve chamber into the control chamber associated with the other power-piston to move said power-pistons in one direction as a unit for disengaging said friction device at will.

12. A hydraulic servo-mechanism constructed in accordance with claim 11 including a central aperture through said partition wall for slidably supporting a thrust-transmitting element adapted to project through both control chambers to mechanically connect said power-piston for movement as a unit under said power-spring in cooperation with fluid-displacement effective between said power-pistons to move the latter as a unit in said one direction.

13. A hydraulic servo-mechanism constructed in accordance with claim 11 in which said moving means are an electric solenoid including electric circuit means for operatively energizing said solenoid to move said valve element to operating position, and a return spring for moving said valve element to normal position upon de-energization of said solenoid.

14. A hydraulic servo-mechanism for controlling a friction engaging device, and including means for supplying pressurized fluid to a pair of power-pistons coaxially arranged in tandem, and which are reciprocably mounted in a fluid chamber enclosure formed with a pair of normally isolated fluid pressure chambers, one for each of said power-pistons, means enabling one of said power-pistons to control normal disengagement and re-engagement of said friction device, comprising means energized by said other power-piston during normal control of said friction device by said one power-piston; fluid passage means between said fluid pressure chambers for enabling said other power-piston to displace fluid against said one power-piston to move said power-pistons as a unit in one direction for effecting auxiliary disengagement of said friction device, under influence of said energized means, and a thrust-transmitting element between said power-pistons enabling thrust transmission from said other power-piston to act on said one power-piston in cooperation with or independently of said fluid-displacement between said power-pistons to move the same as a unit in said one direction; and control valve mechanism operable manually at will for controlling said fluid passage means to place said power-pistons in fluid communication, and to interrupt such communication with said one power-piston to enable normal re-engagement of said friction device.

15. A vehicular change-speed power train having a plurality of forward drive gear sets, a reverse drive gear set, and neutral therefor, and including a friction engaging device for completing said drives when engaged, means operable for controlling engaging and disengaging operations of said friction device, a manual shift-lever for coordinately controlling said drives and neutral, a gate-plate formed with an H-pattern slot arrangement defining a pair of parallel slots and an intermediate cross slot for guiding said shift-lever in its movement to establish a selected drive and neutral, respectively, comprising an enlarged opening defining the terminal portions of each of said parallel slots, a manual element carried by and movable relatively to said shift-lever before and after the establishing of a selected drive, a switch device mounted on said shift-lever for operation by said manual element prior to drive-activating movement of said shift-lever in a selected parallel slot, a projection operably associated with said shift-lever and engageable with a portion of said gate-plate proper for preventing movement of said shift-lever from neutral wherein said switch device is open, means for connecting said manual means to said projection to move the same clear of said gate-plate portion and thereby effecting closure of said switch device and release of said shift-lever for movement in a selected parallel slot to activate the selected drive and neutral, said projection being selectively engageable with said openings terminating said parallel slots and cross slot to lock said shift-lever in its selected gear position or neutral and simultaneously opening said switch device, and when said projection is disengaged from said openings and said cross slot in response to operation of said manual means, for maintaining said switch device closed during a drive-changing operation to prevent fortuitous re-engagement of said friction device under control of said first-defined means and thereby preventing possible damage to said gear sets.

16. A vehicular change-speed drive mechanism having a plurality of forward drive gear sets, a reverse drive gear set and neutral therefor, and including a friction engaging device for completing said drives when engaged, means operable for controlling engagement and disengagement of said friction device, a manual composite shift-lever for coordinately controlling said friction device and said gear sets, and said shift-lever having a lever and a telescopically-related tubular member substantially coextensive thereto, an arcuately formed gate-plate provided with a pair of parallel spaced slots and an intermediate interconnecting slot defining an H-pattern slotted arrangement for selectively guiding said shift-lever in establishing said drives and neutral, an enlarged opening terminating each of the extremities of said parallel slots and each defining the same general configuration as the tubular member in cross section, a pair of opposing lateral channels indented in said tubular member adjacent the lower end thereof with each channel defining an upper horizontal shoulder and a lower arcuate shoulder complemental to the arcuate configuration of said gate-plate and adapted to slidably engage the underside thereof defining opposite marginal portions of said parallel slots, a movable switch element defining the lower end of said tubular member below said arcuate shoulders, a switch contact element carried by said lever for engageable cooperation with the movable contact element, said enlarged openings and said interconnecting slot being adapted to receive said lower end portion of said tubular member when said shift-lever is in a drive activating position and neutral, respectively, to lock said shift-lever against manual movement from or toward neutral and simultaneously engaging said switch contact to control engagement of said friction device to complete the selected drive, a manual element fixed atop said tubular member, a normally compressed return spring operably incorporated between the lever and said tubular member to bias the latter relatively into normal position wherein said shift-lever is locked against fore and aft movements, a pin-and-slot connection operably incorporated between said lever and tubular member, respectively, for defining the relative movement of said tubular member with respect to said lever, said manual element when depressed effecting engagement of said switch contacts and simultaneously disposing said lower end of said tubular member out of the path of said gate-plate slot marginal portions thus placing said lateral channels in alignment therewith, for movement of said shift-lever fore and aft to and from a drive-activating position accompanied by coordinated disengagement of said friction device under control of said first-defined means.

17. A hydraulic servo-mechanism having a pair of separate servomotors with each provided with a cylinder and a power-piston movable therein for disengaging a friction engaging device when moved as a unit in one direction, one of said power-pistons being effective to control normal disengagement and re-engagement of said friction device, a fluid control chamber in each of said cylinders for receiving pressurized fluid to move said power-pistons, a control valve operable for connecting and disconnecting said control chambers, means energizable by said other power-piston during normal friction device operations for moving both of said power-pistons as a unit to effect auxiliary disengagement of said friction device when the latter is engaged and at rest, means for applying engaging force to said friction device under control of said one power-piston, manually-operable means for controlling operation of said control valve at will, and means effective between said power-pistons to apply thrust against said friction device to effect such auxiliary disengagement thereof, in response to releasing said energizable means to act on said other power-piston when the one power-piston is inoperative upon operating said manual means to a predetermined position.

18. Mechanism for controlling engagement and disengagement of a spring-engageable friction engaging device arranged to provide for transmission of torque between a drive member and a driven member when engaged, and including means for supplying pressurized fluid, comprising a dual hydraulic actuator having a fluid enclosure defining a pair of isolated fluid working chambers in each of which a power-piston is reciprocably disposed, one of said power-pistons being effective to control in part normal engagement and to effect normal disengagement of said friction device and the other power-piston serving to effect auxiliary disengagement only of said friction device while at rest; fluid passage means normally closed in part between said working chambers; control valve means having a valve element interposed in said passage means, and which is movable between first and second positions of fluid control to block fluid flow through a portion of said passage means and to enable unrestricted fluid flow therethrough, respectively; a normally compressed power-spring operatively related with said other power-piston for opposing movement thereof and for mechanically effecting said auxiliary disengagement of said friction device when the latter is at rest upon releasing said last-defined power-piston from a fully retracted position wherein pressurized fluid is effective in the related working chamber, and at which position maximum compression of said power-spring is effective; spring means including a normally compressed spring for moving said valve element toward first position whereat said passage means are partially blocked; a fluid passage related with said other power-piston and communicating with said pressure supplying means for the latter to effect retraction of the last-defined power-piston accompanied by maximum compression of said power-spring; a spring controlled one-way check-valve interposed in said fluid passage for preventing pressurized fluid return from said last-defined working chamber, and thereby trapping such pressurized fluid therein to maintain said other power-piston fully retracted while said one power-piston is operative for normally controlling said friction device; operatively energizable means for positioning said valve element in second position in opposition to said spring means and thereby placing both working chambers in unrestricted fluid communication with each other to enable pressure flow from said last-defined working chamber to communicate with the working chamber related with said one power-piston for the latter to effect normal disengagement of said friction device while the other power-piston is maintained fully retracted for maximum compression of said power-spring is effective; manually-controlled means movable between first and second positions for controlling said energizable means, movement from first to second position causing operative energization of said energizable means to move said valve element to second position aforesaid and thereby placing said working chambers in fluid communication with each other for said one power-piston to normally disengage said friction device, and movement from second to first position causing de-energization of said energizable means to release said valve element under reaction from said spring means to partially block said passage means to isolate said working chambers and thereby trapping pressurized fluid in the working chamber related with said other power-piston to enable release of such pressurized fluid from the working chamber related with said one power-piston for the latter to controllably re-engage said friction device automatically under spring-pressure, said other power-piston being maintained fully retracted in readiness for said power-spring to act simultaneously on both power-pistons as a function of fluid-displacement between said working chambers to effect such auxiliary disengagement of said friction device while at rest with said drive and driven members engaged, in response to movement of said manual means from first to second position; and operator-controlled valve means having a fluid flow control orifice in continuous communication with that portion of said passsage means communicating with the working chamber related with said one power-piston, and having a movable control element operably associated with said control orifice whereby the rate of fluid pressure flow from said last-defined working chamber is controllable under operator supervision to regulate the engaging rate of normal spring-pressure engagement of said friction device.

19. Mechanism for controlling engagement and disengagement of a spring-engageable friction engaging device arranged to provide for transmission of torque between a drive member and a driven member when engaged, and including means for supplying pressurized fluid, comprising a dual hydraulic actuator having a fluid enclosure defining a pair of isolated fluid working chambers in each of which a power-piston is reciprocably disposed, one of said power-pistons being effective to control in part normal engagement and disengagement of said friction device and the other power-piston serving to effect auxiliary disengagement only of said friction device when at rest; means for mechanically connecting said power-pistons to move as a unit in one direction only to effect such auxiliary disengagement of said friction device when at rest, and said drive and driven members engaged; fluid passage means normally closed in part between said working chambers; control valve means having a valve element interposed in said passage means, and which is movable between first and second positions of fluid control to block fluid flow through a portion thereof and to enable unrestricted fluid flow therethrough, respectively; a normally compressed power-spring operatively related with said other power-piston for opposing movement thereof and for mechanically effecting said auxiliary disengagement of said friction device when the latter is at rest upon releasing said last-defined power-piston from a fully retracted position wherein pressurized fluid is effective in the related working chamber, and at which position maximum compression of said power-spring is effective; spring means including a normally compressed spring for moving said valve element toward first position whereat said passage means are partially closed; a fluid passage related with said other power-piston and communicating with said pressure supplying means for the latter to effect retraction thereof accompanied by maximum compression of said power-spring; a spring controlled one-way check-valve interposed in said fluid passage for preventing pressurized fluid return from said last-defined working chamber, and thereby trapping pressurized fluid therein to maintain said other power-piston fully retracted while said one power-piston is operative for normally controlling said friction device as aforesaid; operatively energizable means for positioning said valve element in second position in opposition to said spring means and thereby placing both working chamber in unrestricted fluid communication with each other to enable pressure flow from said last-defined working chamber to communicate with the working chamber related with said one power-piston for the latter to effect normal disengagement of said friction device while the other power-piston is maintained fully retracted for maximum compression of said power-spring; manually-controlled means movable between first and second positions for controlling said energizable means, movement from first to second position causing operative energization of said energizable means to move said valve element to second position aforesaid and thereby placing said working chambers in communication with each other for said one power-piston to normally disengage said friction device, and movement from second to first position causing deenergization of said energizable means to release said valve element under reaction from said spring means to partially block said passage means to isolate said working chambers and thereby trapping pressurized fluid in the working chamber related with said other power-piston to enable release of such pressurized fluid from the working chamber related with said one power-piston for the latter to controllably re-engage said friction device automatically under spring-pressure, said other power-piston being maintained fully retracted in readiness for said power-spring to act simultaneously on both power-pistons via said mechanical connection in cooperation with fluid-displacement between said working chambers to effect such auxiliary disengagement of said friction device when at rest with said drive and driven members engaged in response to movement of said manual means from first to second position; and operator-controlled valve means having flow control orifice in continuous communication with that portion of said passage means communicating with the working chamber related with said one power-piston, and having a movable control element operably associated with said control orifice whereby the rate of fluid pressure flow from said last-defined working chamber is controllable under operator supervision to regulate the engaging rate of normal spring-pressure engagement of said friction device.

20. Mechanism for controlling engagement and disengagement of a spring-engageable friction engaging device having an operating portion and arranged to provide for transmission of torque between a drive and a driven member when engaged, and including means operable for controlling in part normal engagement and for effecting normal disengagement of said friction device, means for supplying pressurized fluid, a double-acting hydraulic actuator having a fluid enclosure defining a variable pressure working chamber in which a power-piston is reciprocably disposed to effect auxiliary disengagement only of said friction device when at rest, and means for mechanically connecting said operating portion of said friction device to said power-piston, comprising control valve means having a valve element movable between first and second positions of fluid control; a fluid exhaust passage communicating with said working chamber, and which is controllable by said control valve means to partially trap such pressurized fluid in said working chamber; an intake passage for communicating said pressurized fluid to said working chamber and thereby effecting full retraction of said power-piston and so maintained under control of said control valve means in first position blocking said exhaust passage; a spring controlled one-way check-valve in said intake passage for preventing pressurized fluid return from said working chamber thus fully trapping the pressurized fluid therein; a normally compressed power-spring operatively related with said power-piston and energizable by the latter to maximum compression when fully retracted; another normally compressed spring for biasing said valve element toward first position of fluid control; manually-controlled means operable between first and second positions for controlling said control valve means; and an actuator energizable to move said valve element in opposition to said last-defined spring to second position of fluid control whereby pressurized fluid trapped in said working chamber is released through said exhaust passage to enable movement of said power-piston under influence of said power-spring in response to operating said manual means to second position at will, and thereby effecting auxiliary disengagement of said friction device via said mechanical connecting means notwithstanding the inoperative status of said first-defined means.

21. Mechanism for controlling engagement and disengagement of a spring-engageable friction device arranged to provide for transmission of torque between a drive member and a driven member when engaged, and including means for supplying pressurized fluid, a control chamber related with said pressure supplying means for receiving such pressurized fluid, comprising a dual hydraulic actuator having a fluid enclosure defining a pair of isolated working chambers in each of which a power-piston is reciprocably disposed, one of said power-pistons being effective to control in part normal engagement and to effect normal disengagement of said friction device and the other power-piston serving to effect auxiliary disengagement only of said friction device when at rest; a control chamber related with said pressure supplying means for receiving such pressurized fluid; fluid passage means normally closed in part between said working chambers; control valve means having a valve element interposed in said passage means, and which is movable between first and second positions of fluid control to block fluid flow through a portion thereof and to enable unrestricted fluid therethrough, respectively; a normally compressed power-spring operatively related with said other power-piston for opposing movement thereof and for mechanically effecting said auxiliary disengagement of said friction device when the latter is at rest upon releasing said last-defined power-piston from a fully retracted position wherein pressurized fluid is effective in the related working chamber, and at which position maximum compression of said power-spring is effective; spring means including a normally compressed spring for moving said valve element to first position whereat said passage means are partially blocked; a fluid passage related with said other power-piston and communicating with said pressure supplying means for the latter effect retraction of the last-defined power-piston accompanied by maximum compression of said power-spring; a spring controlled one-way check-valve interposed in said fluid passage for preventing pressurized fluid return from said last-defined working chamber, and thereby trapping such pressurized fluid therein to maintain said other power-piston fully retracted while said one power-piston is operative for normally controlling said friction device as aforesaid; operatively energizable means for positioning said valve element in second position in opposition to said spring means and thereby placing both working chambers in unrestricted fluid communication with each other to enable pressure flow from said last-defined working chamber to communicate with the working chamber related with said one power-piston for the latter to effect normal disengagement of said friction device while the other power-piston is maintained fully retracted for maximum compression of said power-spring; manually-controllable means movable between first and second positions for controlling said energizable means, movement from first to second position causing operative energization of said energizable means to move said valve element to second position aforesaid and thereby placing said working chambers in communication with each other for said one power-piston to normally disengage said friction device, and movement from second to first position causing de-energization of said energizable means to release said valve element under reaction from said spring means to partially block said passage means to isolate said working chambers and thereby trapping pressurized fluid in the working chamber related with said other power-piston to enable release of such pressurized fluid from the working chamber related with said one power-piston for the latter to controllably re-engage said friction device automatically under spring-pressure, said other power-piston being maintained fully retracted in readiness for said power-spring to act simultaneously on both power-pistons as a function of fluid-displacement between said working chambers to effect such auxiliary disengagement of said friction device when at rest with said drive and driven members engaged, in response to movement of said manual means from first to second position; operator-controlled valve means having a fluid flow control orifice in continuous communication with that portion of said passage means communicating with the working chamber related with said one power-piston, and having a movable control element operably associated with said control orifice whereby the rate of fluid pressure flow from said last-defined working chamber is controllable under operator supervision to regulate the engaging rate of normal spring-pressure engagement of said friction device; and a fluid pressure responsive control device in continuous communication with said control chamber for controlling energization and de-energization of said energizable means to move said valve element to second position and to release the same under influence of said spring means for movement toward first position partially blocking said passage means, respectively, said control device being operable from normal position wherein said energizable means are operatively energized automatically, to a different control position wherein said energizable means are de-energized automatically, in response to a predetermined range of pressure increase in said control chamber irrespective of the position aforesaid occupied by said manually-controlled means.

22. Mechanism for controlling engagement and disengagement of a spring-engageable friction engaging device arranged to provide for transmission of torque between a drive member and a driven member when engaged, and including means for supplying pressurized fluid, a control chamber related with said pressure supplying means for receiving such pressurized fluid, and a pair of isolated fluid working chambers, comprising a power-piston reciprocably disposed in each of said working chambers, one of said power-pistons being effective to control in part normal engagement and to effect normal disengagement of said friction device and the other power-piston serving to effect auxiliary disengagement only of said friction device when at rest; means for mechanically connecting said power-pistons to move as a unit in one direction only to effect such auxiliary disengagement of said friction device when at rest, and said drive and driven members engaged; fluid passage means normally closed in part between said working chambers; control valve means having a valve element interposed in said passage means, and which is movable between first and second positions of fluid control to block fluid flow through a portion thereof and to enable unrestricted fluid flow therethrough, respectively; a normally compressed power-spring operatively related with said other power-piston for opposing movement thereof and for mechanically effecting said auxiliary disengagement of said friction device when the latter is at rest upon releasing said last-defined power-piston from a fully retracted position wherein pressurized fluid is effective in the related working chamber, and at which position maximum compression of said power-spring is effective; spring means including a normally compressed spring for moving said valve element toward first position whereat said passage means are partially closed; a fluid passage related with said other power-piston and communicating with said pressure supplying means for the latter to effect retraction thereof accompanied by maximum compression of said power-spring; a spring controlled one-way check-valve interposed in said fluid passage for preventing pressurized fluid return from said last-defined working chamber, and thereby trapping pressurized fluid therein to maintain said other power-piston fully retracted while the one power-piston is operative for normally controlling said friction device as aforesaid; operatively energizable means for positioning said valve element in second position in opposition to said spring means and thereby placing both working chambers in unrestricted fluid communication with each other to enable pressure flow from said last-defined working chamber to communicate with the working chamber related with said one power-piston for the latter to effect normal disengagement of said friction device while the other power-piston is maintained fully retracted for maximum compression of said power-spring; manually-controlled means movable between first and second positions for controlling said energizable means, movement from first to second position causing operative energization of said energizable means to move said valve element to second position aforesaid and thereby placing said working chambers in communication with each other for said one power-piston to normally disengage said friction device, and movement from second to first position causing de-energization of said energizable means to release said valve element under reaction from said spring means to partially block said passage means to isolate said working chambers and thereby trapping pressurized fluid in the working chamber related with said other power-piston to enable release of such pressurized fluid from the working chamber related with said one power-piston for the latter to controllably re-engage said friction device automatically under spring-pressure, said other power-piston being maintained fully retracted in readiness for said power-spring to act simultaneously on both power-pistons via said mechanical connection in cooperation with fluid-displacement between said working chambers to effect such auxiliary disengagement of said friction device when at rest with said drive and driven members engaged, in response to movement of said manual means from first to second position; operator-controlled valve means having a fluid flow control orifice in continuous communication with that portion of said passage means communicating with the working chamber related with said one power-piston, and having a movable control element operably associated with said control orifice whereby the rate of fluid pressure flow from said last-defined working chamber is controllable under operator supervision to regulate the engaging rate of normal spring-pressure engagement of said friciton device; and a fluid pressure responsive control device in continuous communication with said control chamber for controlling energization and de-energization of said energizable means to move said valve element to second position and to release the same under influence of said spring means for movement toward first position partially blocking said passage means, respectively, said control device being operable from normal position wherein said energizable means are operatively energized automatically, to a different control position wherein said energizable means are de-energized automatically, in response to a predetermined range of pressure increase in said control chamber irrespective of the position aforesaid occupied by said manually-controlled means.

23. Mechanism for controlling engagement and disengagement of a spring-engageable friction engaging device having an operating portion and arranged to provide for transmission of torque between a drive member and a driven member when engaged, and including means operable for controlling in part normal engagement and for effecting normal disengagement of said friction device, a fluid control chamber related with said pressure supplying means for receiving such pressurized fluid, and a double-acting hydraulic actuator having a fluid enclosure defining a variable pressure working chamber, comprising a power-piston reciprocably disposed in said working chamber to control auxiliary disengagement of said friction device when engaged at rest; means for mechanically connecting said power-piston to said operating portion of said friction device to effect such auxiliary disengagement of the latter; control valve means having a valve element movable between first and second positions of fluid control; a fluid exhaust passage communicating with said working chamber, and which is controllable by said control valve means to partially trap such pressurized fluid in said working chamber; an intake passage for communicating said pressurized fluid to said working chamber and thereby effecting full retraction of said power-piston and so maintained under control of said control valve means in first position blocking said exhaust passage; a one-way spring controlled check-valve in said intake passage for preventing pressurized fluid return from said working chamber thus fully trapping the pressurized fluid therein; a normally compressed power-spring operatively related with said power-piston and energizable by the latter to maximum compression when fully retracted; another normally compressed spring for biasing said valve element toward first position of fluid control; manually-controllable means operable between first and second positions for controlling said control valve means; an actuator energizable to move said valve element in opposition to said last-defined spring to second position of fluid control whereby pressurized fluid trapped in said working chamber is released through said exhaust passage to enable movement of said power-piston under influence of said power-spring in response to operating said manual means to second position at will, and thereby effecting auxiliary disengagement of said friction device via said mechanical connecting means notwithstanding the inoperative status of said first-defined means; and a fluid pressure responsive control device in continuous communication with said control chamber for controlling energization and de-energization of said energizable actuator to move said valve element to second position and to release the same under influence of said last-defined spring for movement to first position partially blocking said exhaust passage, said control device being operable from normal position wherein said energizable actuator is energized automatically, to a different control position wherein said energizable actuator is de-energized automatically, in response to a predetermined range of pressure increase in said control chamber irrespective of the position aforesaid occupied by said manually-controlled means.

24. Mechanism for controlling a friction engaging device having a drive member and a driven member characterized by spring engagement for transmission of torque produced by a prime mover when activated, and including means for controlling normal engagement and disengagement of said drive and driven members, comprising energizable power means for effecting auxiliary disengagement only of said drive and driven members when normally engaged at rest, and said prime mover at rest under torque transmitted by said engaged members under a torque-load; energizing means for said power means; and manually-controlled means between said energizing means and said power means for controlling the latter at will to effect such auxiliary disengagement of said drive and driven members, and thereby removing said torque-load from said prime mover to enable activation of the latter accompanied by normal engaging and disengaging operations of said drive and driven members under control of said first-defined means.

25. Mechanism for controlling a friction engaging device for a vehicle, and which is characterized by actuatable means for controlling normal engagement and disengagement thereof and wherein normal engagement is under spring means when said vehicle and friction device are at rest, the improvement which comprises: an energizable actuator provided with a work-performing element including energizing means therefor; control means for controlling said energizing means to render said work element ineffective to disengage said friction device during normal engaging and disengaging operations of the latter under control of said actuatable means notwithstanding said actuator is energized; manual means for controlling said control means to release said energized actuator and thereby enabling said work element to effect auxiliary disengagement of said friction device at will while the latter and said vehicle are at rest notwithstanding said spring means have effected normal engagement of said friction device.

26. In control mechanism for a friction engaging device having driving and driven members relatively rotatable when disengaged and co-rotatable for transmission of torque at maximum efficiency when engaged, said friction engaging device being adapted for vehicular use, and power means for effecting normal disengagement of said friction members and pre-energized spring means for effecting normal engagement thereof effective during vehicular operation and when the vehicle and said friction members are at rest, the improvement which comprises: auxiliary power means including a source of power to activate the same; a power-spring energizable by said auxiliary power means when activated for effecting disengagement of said friction members upon the latter and said vehicle coming to rest notwithstanding said spring means have effected normal engagement of said friction members; control means for controlling said power source for maintaining said auxiliary power means in effective power-spring energizing position during rotation of said friction members without interfering with the aforesaid normal disengaging and engaging operations of the latter under control of said first-defined power means and said spring means, respectively; and manual means for controlling said control means to deactivate said auxiliary power means at will and thereby releasing said energized power-spring to effect disengagement of said friction members upon the latter and said vehicle coming to rest notwithstanding said spring means for engaging said friction members have effected normal engagement thereof.

27. A power-supply system including an internal-combustion engine for propelling a vehicle or the like, a friction engaging device having a drive member drivingly connected to said engine, and a driven member, mechanism for providing a power train including said friction device for completing said power train upon activation thereof and engagement of said friction device, said power train being characterized by a plurality of selective drives and neutral therefor, a control device operable in synchronism with selective activation of said drives and neutral, and manual means operable for selectively activating said drives and neutral at will, comprising: dual power-mechanism characterized by a main power member for controlling normal engagement and disengagement of said friction device under control of said control device when said manual means are operative to activate said drives and neutral, and by an auxiliary power member for moving said main power member in one direction only as a unit, and serving only to disengage said friction device when normal control under said main power member aforesaid is prohibited due to coasting torque-load effective on an activated drive as a function of compression-power braking from said engine while at rest opposing vehicular movement; means for energizing said power members; a control portion in said control device operative to place said energizing means in communication with both power members and to block such communication therebetween for normal disengagement and engagement, respectively, of said friction device under normal control of said main power member, and for maintaining said auxiliary power member energized despite normal control under said main power member being effective when said engine is operating; another control device operably related with said manual means for controlling said first-defined control device to place said energizing means in communication with both power members as aforesaid and to release said auxiliary power member when normal control by said main power member is prohibited, to move the latter in said one direction as a unit to disengage said friction device accompanied by removal of coasting torque-load from said activated drive thus releasing said manual means for operatively neutralizing said activated drive so that the engine can be started.

28. A power-supply system including an internal-combustion engine for propelling a vehicle or the like, a friction engaging device having a drive member drivingly connected to said engine, and a driven member, mechanism for providing a power train including said friction device for completing said power train characterized by a plurality of selective drives and neutral therefor, upon activation of a selected drive thereof and engagement of said friction device, means operable for engaging said friction device, a first control device operable in synchronism with selective activation of said drives and neutral, manual means operable for selectively activating said drives and neutral at will, and a second control device operable in response to variations in vehicular speed, comprising: dual power-mechanism characterized by a main power member for controlling normal engagement of said friction device under control of said first control device when said manual means are operative, and by an auxiliary power member for moving said main power member in one direction as a unit, and serving only to disengage said friction device when normal control under said main power member aforesaid is prohibited due to coasting torque-load effective on an activated drive as a function of compression-power braking from said engine while at rest opposing vehicular movement; means for energizing said power members; a control portion in said first control device operative to place said energizing means in communication with both power members and to block such communication therebetween for normal disengagement and engagement, respectively, of said friction device under normal control of said main power member, and for maintaining said auxiliary power member energized despite normal control under said main power member being effective when said engine is operating; said second control device being effective upon vehicular speed reaching a predetermined minimal factor for controlling said first control device to place said power members in communication with said energizing means to enable said main power member to disengage said friction device automatically, and simultaneously maintain said auxiliary power member energized irrespective of the activated condition of said power train.

29. Mechanism for controlling engagement and disengagement of a friction engaging device having an operating portion and arranged to provide for transmission of torque when engaged under spring means, and including operating means for controlling normal engagement and disengagement of said friction device, operatively energizable means for effecting auxiliary disengagement of said friction device when engaged at rest the second-defined means inoperative, and means for energizing said energizable means, comprising a work performing element between said energizable means and said operating portion of said friction device to effect such auxiliary disengagement of the latter; control means for controlling said energizing means to energize said energizable means; and manually-controllable means for controlling said control means to render said energizable means operative to effect said auxiliary disengagement of said friction device at will notwithstanding the inoperative status of said second-defined means.

30. A vehicular power drive system including an internal-combustion engine, accelerator mechanism having a throttle-valve operable between released engine-idling position and depressed engine-accelerating positions for controlling said engine, a spring-engageable friction engaging device having a drive member drivingly connected to said engine and a driven member in series with a change-speed gear transmission having a driving shaft connected to said driven member, a driven shaft, a plurality of forward drive gear trains and a reverse drive gear train for connecting said shafts in variant relative driving speed relations and including neutral therefor, said engine having an intake-manifold in which vacuum efficiency varies in accordance with engine speed regulated by the degree of throttle-valve opening, and an engine-driven hydraulic pump having a pressure regulator valve and a source of hydraulic fluid, for supplying pressurized fluid, comprising: a dual hydraulic servo-mechanism having a cylindrically walled cylinder closed at opposite ends and provided with a medial partition wall dividing the same into a pair of variable pressure working chambers in each of which a power-piston is reciprocably disposed and normally occupying fully retracted and protracted positions, respectively, one of said power-pistons being effective to control in part normal engaging and to effect disengaging operations of said friction device and the other power-piston serving to effect an auxiliary disengaging operation of said friction device when the one power-piston is inoperative due to the vehicle being at rest under coasting-torque produced by vehicle load when the latter is parked "in-gear"; a power-spring operatively energizable to maximum energization in response to full retraction of said other power-piston to operate both power pistons as a unit in one direction only upon releasing the fluid trapped in the working chamber related with the latter power piston to act on the one power-piston; control valve means for said servo-mechanism and having a valve body provided with a longitudinal bore communicating with the exterior thereof via three fluid passages, a first of which communicates with the working chamber related with said other power-piston, and the second of which continuously communicates with the working chamber related with the one power-piston, a valve-piston shiftably disposed in said valve bore, and which is formed with a pair of fluid flow control lands in longitudinally spaced relation with a reduced interconnecting portion to produce an annular valve chamber therebetween, one of said valve lands being effecttive to enable fluid flow via said one passage between said valve chamber and the working chamber related with said other power-piston when said valve-piston is in one position, and to interrupt such flow when the latter is in a different position, and the other of said valve lands being effective to control fluid flow between said valve chamber and said third passage aforesaid when said valve piston is in its different position, and to interrupt such flow when said valve-piston is in its one position aforesaid; an electric solenoid having a casing containing a sleeve-type winding in which a work-performing armature is reciprocably disposed and which is connected to said valve-piston to shift the same from said different position to said one position of fluid flow control upon energization of said winding and thereby connecting said first and second passages via said valve chamber and isolating said third passage therefrom whereby said working chambers are placed in fluid communication with each other, and to interrupt such communication therebetween when said valve-piston is shifted from said one position to said different position of fluid flow control under influence of spring pressure produced by a normally compressed spring upon de-energization of said winding, and thereby isolating said working chambers without interrupting fluid communication between said second passage and the working chamber related with said one power-piston and establishing fluid communication between said valve chamber and said third passage; hydraulic conduit means between the output side of said pump and said working chamber related with said other power-piston; a one-way spring controlled check-valve interposed in said conduit means for preventing back flow from the working chamber related with said other power-piston; engaging-control valve means for said friction device and having a fluid flow control orifice in continuous communication with said third passage, and a movable fluid control element operably associated with said control orifice whereby the rate of fluid flow from the working chamber related with said one power-piston via said valve chamber and communicating third passage aforesaid, is controllable under operator supervision to regulate the engaging rate of normal spring-pressure engagement of said friction device; a vacuum-servo having a movable power member subject to vacuum on one side and to atmospheric pressure on the other side effective to create a pressure differential effective to move said power member in one direction only; a mechanical connection between said power member and control element enabling unitary movement thereof whereby the latter is fully retracted relatively to said control orifice wherein the latter is blocked in response to high vacuum efficiency in said intake-manifold induced by engine-idling, acting on said power member; vacuum conduit means between said intake-manifold and the vacuum side of said power member; a relief portion indented in said control element adjacent the normal diameter end thereof blocking fluid flow through said control orifice; a fluid return chamber continuously communicating with said control orifice opposite said third passage; another normally compressed spring reacting on the vacuum side of said power member urging the latter and said movable control element toward unblocking position with respect to said control orifice, said other spring being effective to move said power member and connected movable control element to dispose said relief portion relatively to said control orifice, and thereby progressively decreasing the blocked status of said control orifice as vacuum is lowered in said intake-manifold as a function of engine acceleration, with corresponding release of fluid from the working chamber related with said one power-piston to enable normal spring-pressure engagement of said friction device under operator supervision; a return conduit between said fluid return chamber and said fluid source; another one-way spring controlled check-valve interposed in said return conduit for preventing cavitation in said fluid return chamber, third passage, annular valve chamber and second passage leading to the working chamber related with said one power-piston when in fully retracted position corresponding to full normal engagement of said friction device; manual mechanism having a shift-lever operable for selectively changing the drives of said change-speed transmission, and for establishing neutral therefor; a control device carried by said shift-lever and movable relatively thereto before and after operating the latter as aforesaid; electric circuit means having two branches which include the aforesaid solenoid and a source of electric energy; a master switch device having a contact member movable to closed position for connecting said circuit means and said electric source; another switch device interposed in series in one of said branch circuits and having a contact member movable in response to synchronous relative movements aforesaid of said control device to closed and open positions to complete and interrupt, respectively, said one branch circuit whereby closed position causes the winding of said solenoid to be energized and thereby operating its work armature to shift the aforesaid valve piston to said one position wherein said working chambers of said servo-mechanism are connected as aforesaid to simultaneously receive pressurized fluid from said pump thus causing protraction of said one power-piston to effect a normal disengaging operation of said friction device while maintaining said other power-piston in fully retracted position and the operatively related power-spring at maximum energization, whereupon release of said control device to open said other switch device after operating said shift-lever to a selected drive-establishing position or neutral, is effective to interrupt energization of said one branch circuit whereby said winding of the solenoid is de-energized with consequent return of said valve-piston to said different position under the aforesaid first-defined compressed spring wherein said working chambers are isolated to enable release of fluid from the working chamber related with said one power-piston via said annular valve chamber, and said other check-valve through said return conduit to the fluid source aforesaid, under control of the aforesaid engaging-control valve for operator supervised normal spring-pressure engagement of said friction device to propel said vehicle without interrupting the aforesaid fully retracted position of said other power-piston so maintained by the fluid trapped in the related working chamber between said one control land on said valve-piston and said first-defined check-valve; a third switch device interposed in the other of said branch circuits and having a contact member movable in response to variations in pressure output by said pump to open position and by spring pressure to closed position when said hydraulic pressure drops below a predetermined value, said last-defined contact member being responsive to hydraulic pressure modulation within a predetermined range to open and close the latter switch device, closed position being effective to complete said other branch circuit with consequent energization of the winding of said solenoid and thereby operating its work armature to shift said valve-piston to said one position wherein said working chambers are placed in communication with each other to provide normal disengagement of said friction device automatically upon engine speed dropping to a predetermined value irrespective of the operating status of said change-speed transmission, and upon increasing engine speed within the aforesaid predetermined range the last-defined contact member is moved to open position and thereby interrupting said other branch circuit with consequent de-energization of the winding of said solenoid to release its work armature for said first-defined spring to shift said valve-piston to said different position to enable trapped fluid in the working chamber related with said one power-piston for release via said engaging-control valve as aforesaid for said friction device to normally engage under spring pressure aforesaid automatically, and under which condition with the engine at rest and the change-speed transmission "in-gear" with coasting torque effective thereon from the vehicle, manual movement of said control device to close the other switch device is effective to cause energization of the solenoid winding to operate its work armature and shift said valve-piston to said one position and thereby placing the two working chambers in communication with each other for said other power-piston to operate said one power-piston under said energized power-spring to effect said auxiliary disengagement of said friction device, and thereby removing such coasting torque from said change-speed transmission induced by compression-power braking of said engine at rest in opposition to vehicle movement, and releasing said shift-lever for operation to neutralize said transmission to enable starting the engine for normal engaging and disengaging operations of said friction device to ensue under said one power-piston.

References Cited

UNITED STATES PATENTS

| | | | |
|---|---|---|---|
| 2,144,034 | 1/1939 | Sanford | 192—076 |
| 2,344,399 | 3/1944 | Eaton | 192—052 |
| 2,541,515 | 2/1951 | Hoffman et al. | 192—101 |
| 2,566,642 | 9/1951 | Thomas | 192—91 X |
| 2,580,108 | 12/1951 | Long et al. | 192—3.5 X |
| 3,020,094 | 2/1962 | Murty et al. | |
| 3,166,165 | 1/1965 | Anderson et al. | 192—3.5 |
| 3,177,993 | 4/1965 | Riel | 192—91 X |
| 3,245,502 | 4/1966 | Randel | 192—.075 |

BENJAMIN W. WYCHE III, *Primary Examiner.*